United States Patent
Jo et al.

(10) Patent No.: US 9,094,980 B2
(45) Date of Patent: Jul. 28, 2015

(54) APPARATUS AND METHOD FOR ALLOCATING FREQUENCY RESOURCE TO MICRO UE IN A MOBILE COMMUNICATION SYSTEM

(75) Inventors: Junho Jo, Anyang-si (KR); Byoung Hoon Kim, Anyang-si (KR); Jihyun Lee, Anyang-si (KR); Hano Wang, Seoul (KR); Dae Sik Hong, Seoul (KR); Go San Noh, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 707 days.

(21) Appl. No.: 13/508,623

(22) PCT Filed: Nov. 9, 2010

(86) PCT No.: PCT/KR2010/007878
§ 371 (c)(1),
(2), (4) Date: May 8, 2012

(87) PCT Pub. No.: WO2011/056048
PCT Pub. Date: May 12, 2011

(65) Prior Publication Data
US 2012/0225662 A1  Sep. 6, 2012

Related U.S. Application Data

(60) Provisional application No. 61/259,217, filed on Nov. 9, 2009.

(30) Foreign Application Priority Data

Aug. 27, 2010  (KR) .......................... 10-2010-0083431

(51) Int. Cl.
*H04W 72/00* (2009.01)
*H04W 40/00* (2009.01)
*H04W 36/00* (2009.01)
*H04W 72/04* (2009.01)
*H04W 72/08* (2009.01)
*H04W 84/04* (2009.01)

(52) U.S. Cl.
CPC .......... *H04W 72/0486* (2013.01); *H04W 72/08* (2013.01); *H04W 84/045* (2013.01)

(58) Field of Classification Search
CPC ..... H04W 16/14; H04W 16/16; H04W 16/32; H04W 24/00; H04W 52/24; H04W 72/04; H04W 72/0486; H04W 72/08; H04W 84/045; H04B 7/0619; H04L 5/0032; H04L 5/0035
USPC .......................... 455/63.1, 114.2, 278.1, 296, 455/446–452.2, 454–455, 464, 509; 370/252, 329, 431, 445
See application file for complete search history.

(56) References Cited

U.S. PATENT DOCUMENTS

| 2007/0115879 A1 | 5/2007 | Shin et al. |
| 2008/0146154 A1* | 6/2008 | Claussen et al. ............. 455/63.1 |

(Continued)

FOREIGN PATENT DOCUMENTS

KR   10-2009-0004164 A   1/2009

*Primary Examiner* — Michael Mapa
(74) *Attorney, Agent, or Firm* — Ladas & Parry, LLP

(57) ABSTRACT

A method and apparatus for allocating a frequency resource to each micro User Equipment (UE) in a hierarchical cellular mobile communication system are disclosed. The method includes acquiring information about traffic of each macro UE or a macro BS in a frequency resource allocated to the macro UE or the macro BS, first Signal-to-Noise Ratio (SNR) information about an SNR of a signal from the macro UE or the macro BS, measured at each micro UE and second SNR information about an SNR of a signal from the micro UE, measured at each micro BS, calculating throughput of the micro UE using the traffic information, the first SNR information and the second SNR information, determining a frequency resource to be allocated to the micro UE using information about the calculated throughput and allocating the determined frequency resource to the micro UE.

37 Claims, 15 Drawing Sheets

(56) References Cited

U.S. PATENT DOCUMENTS

| | | |
|---|---|---|
| 2008/0181161 A1* | 7/2008 | Gi Kim et al. ............... 370/312 |
| 2009/0046665 A1* | 2/2009 | Robson et al. ............... 370/332 |
| 2009/0215452 A1 | 8/2009 | Balasubramanian et al. |
| 2010/0188997 A1* | 7/2010 | Aoyama et al. ............... 370/252 |
| 2011/0002284 A1* | 1/2011 | Talwar et al. ............... 370/329 |
| 2011/0051684 A1* | 3/2011 | Li et al. ............... 370/331 |
| 2011/0086641 A1* | 4/2011 | Guvenc et al. ............... 455/437 |

* cited by examiner

APPARATUS AND METHOD FOR ALLOCATING FREQUENCY RESOURCE TO MICRO UE IN A MOBILE COMMUNICATION SYSTEM

CROSS REFERENCE TO RELATED APPLICATIONS

This application is the National Phase of PCT/KR2010/007878 filed on Nov. 9, 2010, which claims priority under 35 U.S.C. 119(e) to U.S. Provisional Application No. 61/259,217 filed on Nov. 9, 2009 and under 35 U.S.C. 119(a) to Patent Application No. 10-2010-0083431 filed in Republic of Korea on Aug. 27, 2010, all of which are hereby expressly incorporated by reference into the present application.

TECHNICAL FIELD

The present invention relates to mobile communications, and more particularly, to an apparatus and method for allocating a frequency resource to a micro User Equipment (UE) in a hierarchical cellular mobile communication system.

BACKGROUND ART

A mobile communication system can be designed to have a hierarchical cell structure wherein a macrocell covering a whole cell is overlaid with microcells (e.g. femtocells) covering parts of the cell. The hierarchical cell structure based on a typical cellular network was proposed to improve frequency resource utilization and to extend cell coverage, for example, communication coverage. When there are geographical obstacles in a cell or a shadowing area is created indoors, the hierarchical cell structure can extend communication coverage. Deployment of a small microcell in a shadowing area where communication is impossible due to signal attenuation enables low cost communication coverage extension. In this case, unused resources are allocated to the microcell in order to prevent interference between the macrocell and the microcell.

As stated above, the hierarchical cell structure can service more UEs and data using frequency resources through efficient use of frequency resources. In an environment where a macrocell is overlaid with microcells, resources used by the macrocell are reused for the small microcells, thereby increasing frequency resource utilization. Consequently, cell capacity can be remarkably increased.

However, interference may occur because a macro UE connected to the macrocell and a micro UE connected to a microcell use the same frequency resources in the spatially non-separated environment. To avert this problem, interference avoidance may be employed.

Interference avoidance is a technique of preventing interference caused by simultaneous transmission from a macro UE and a micro UE. Frequency resource priority is given to the macro UE over the micro UE regarding, and the micro UE is allowed to transmit signals only when the macro UE is not using the frequency resources. Therefore, the micro UE should determine whether the macro UE is transmitting signals or not using the frequency resources. The determination may be made through Cognitive Radio (CR) spectrum sensing.

CR is a technology for wireless communication in which an unlicensed user having no available frequency resources detects temporarily unused frequency resources of a licensed user, referred to as a spectrum hole or white space, and operates adaptively according to an optimum transmission scheme for the detected frequency resources. This frequency sharing scheme was proposed based on the idea that although the licensed user has frequency resources, the licensed user does not use the frequency resources at all times.

Accordingly, the unlicensed user may share the frequency resources with the licensed user without mutual interference by detecting a time period during which the licensed user does not use the frequency resources through spectrum sensing. Spectrum sensing is an essential technique in CR.

Spectrum sensing may be carried out using one of a matched filter detector, a feature detector, and an energy detector in the physical layer of a communication system. The matched filter detector and the feature detector are not popular in view of implementation complexity and the need that an unlicensed user should know signal characteristics of a licensed user in advance. In this context, energy detection-based spectrum sensing will be focused upon herein.

If a macrocell coexists with a microcell through CR spectrum sensing in a hierarchical cell structure, a macro UE and a micro UE serve as a licensed UE and an unlicensed UE, respectively. The microcell is overlaid on the macrocell and the micro UE is connected to the microcell by sensing frequency resources unused by the macro UE.

An environment where a macrocell has available frequency resources and a plurality of macro UEs use the frequency resources simultaneously is considered because of channelization characteristics of a macro UE system whose frequency resources will be reused. For example, an Institute of Electrical and Electronics Engineers (IEEE) 802.16e Mobile Worldwide interoperability for Microwave Access (WiMAX) system divides a channel into 16 subchannels.

When a plurality of micro UEs within a microcell use frequency resources of a macrocell, it is important for the micro UEs to share the frequency resources by detecting a time period during which the frequency resources are not used by the macro UEs through spectrum sensing. However, a method for allocating macrocell frequency resources to each micro UE by a micro Base Station (BS) has yet to be specified.

DISCLOSURE

Technical Problem

An object of the present invention devised to solve the problem lies on a method for allocating a frequency resource to a micro UE in a hierarchical cellular mobile communication system.

Another object of the present invention devised to solve the problem lies on a micro BS for allocating a frequency resource to a micro UE in a hierarchical cellular mobile communication system.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for allocating a frequency resource to each micro UE at a micro BS in mobile communication system of a hierarchical cell structure, including acquiring information about traffic of each macro UE or a macro BS in a frequency resource allocated to the macro UE or the macro BS, first Signal-to-Noise Ratio (SNR) information about an SNR of a signal from the each macro UE or the macro BS, measured at each micro UE, and second SNR information about an SNR of a signal from the each micro UE, measured at each micro BS, calculating throughput of the micro UE using the traffic information, the first SNR information, and the second SNR information, determining a frequency resource to be allocated to the each micro UE using information about the calculated throughput, and allocating the determined frequency resource to the each micro UE.

In another aspect of the present invention, provided herein is a method for allocating frequency resources to each micro UE in a micro BS in mobile communication system of a hierarchical cell structure, including acquiring information about traffic of each macro UE or a macro BS in a frequency resource allocated to the each macro UE or the macro BS and SNR information about an SNR of a signal from the micro BS, measured at the each micro UE, calculating throughput of the micro UE using the traffic information and the SNR information, determining a frequency resource to be allocated to the each micro UE using information about the calculated throughput, and allocating the determined frequency resource to the each micro UE.

In another aspect of the present invention, provided herein is a micro BS for allocating frequency resources to each micro UE in mobile communication system of a hierarchical cell structure, including an initial information acquisition module for acquiring information about traffic of each macro UE or a macro BS in a frequency resource allocated to the macro UE or the macro BS, first SNR information about an SNR of a signal from each the macro UE or the macro BS, measured at each micro UE, and second SNR information about an SNR of a signal from the each micro UE, measured at each micro BS, a throughput calculation module for calculating throughput of the micro UE using the traffic information, the first SNR information, and the second SNR information, a frequency resource decision module for determining a frequency resource to be allocated to the each micro UE using information about the calculated throughput, and a frequency resource allocation module for allocating the determined frequency resource to the each micro UE.

In a further aspect of the present invention, provided herein is a micro BS for allocating frequency resources to each micro UE in mobile communication system of hierarchical cell structure, including an initial information acquisition module for acquiring information about traffic of each macro UE or a macro BS in a frequency resource allocated to the each macro UE or the macro BS and SNR information about an SNR of a signal from the micro BS, measured at the each micro UE, a throughput calculation module for calculating throughput of the each micro UE using the traffic information and the SNR information, a frequency resource decision module for determining a frequency resource to be allocated to the each micro UE using information about the calculated throughput, and a frequency resource allocation module for allocating the determined frequency resource to the each micro UE.

Advantageous Effects

According to the present invention, communication performance can be increased by allocating a frequency resource to a micro UE in a manner that maximizes throughput, while keeping interference with macro UEs at the same level as in conventional technology.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a $3^{rd}$ Generation Partnership Project Long Term Evolution (3GPP LTE) system is used. However, the description is applicable to any other mobile communication system except for features inherent to the 3GPP LTE system.

In some instances, known structures and devices are omitted or are shown in block diagram form focusing on important features of the structures and devices, so as not to obscure the concept of the present invention. The same reference numbers will be used throughout this specification to refer to the same or like parts.

In the following description, the term 'User Equipment (UE)' refers to a mobile or fixed user end device such as a Mobile Station (MS), an Advanced Mobile Station (AMS), etc. and the term 'Base Station (BS)' refers to any node of a network end, such as a Node B, an evolved Node B (eNB or eNodeB), an Advanced Base Station (ABS), an Access Point (AP), etc., communicating with the UE.

In a mobile communication system, a UE may receive information from a BS on a downlink and transmit information to the BS on an uplink. The information transmitted from or received at the UE includes data and various control information and a variety of physical channels are defined according to the types and usages of the information.

Figure 1:
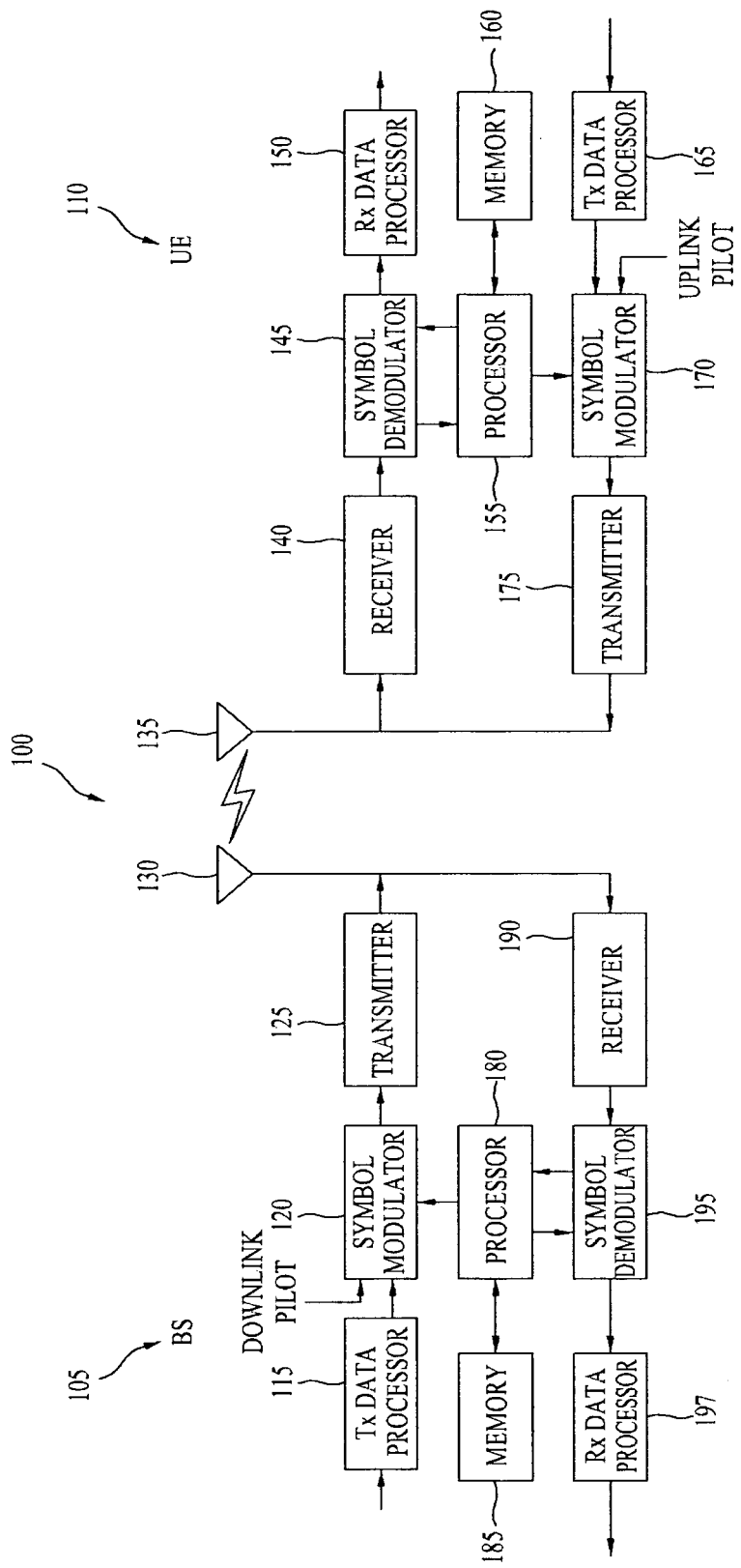
FIG. 1 is a block diagram of a Base Station (BS) and a User Equipment (UE) in a wireless communication system according to the present invention.

FIG. 1 is a block diagram of a BS and a UE in a wireless communication system according to an embodiment of the present invention.

While one BS 105 and one UE 110 are shown in FIG. 1 to simplify the configuration of a wireless communication system 100, the wireless communication system 100 may obviously include a plurality of BSs and/or a plurality of UEs.

Referring to FIG. 1, the BS 105 may include a Transmission (Tx) data processor 115, a symbol modulator 120, a transmitter 125, a Transmission/Reception (Tx/Rx) antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the BS 105 and the UE 110, the BS 105 and the UE 110 may each have a plurality of antennas.

On the downlink, the Tx data processor 115 receives traffic data, processes the received traffic data through formatting, coding, interleaving, and modulation (i.e. symbol mapping), and thus outputs modulated symbols (or data symbols). The symbol modulator 120 processes the data symbols received from the Tx data processor 115 and pilot symbols, thus producing a symbol stream.

More specifically, the symbol modulator 120 multiplexes the data symbols with the pilot symbols and transmits the multiplexed symbols to the transmitter 125. Each transmission symbol may be a data symbol, a pilot symbol or a null (zero value). The pilot symbols may be transmitted successively during each symbol period. The pilot symbols may be Frequency Division Multiplexing (FDM) symbols, Orthogonal Frequency Division Multiplexing (OFDM) symbols, Time Division Multiplexing (TDM) symbols, or Code Division Multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the BS 105 and provides the received downlink signal to the receiver 140. The receiver 140 processes the downlink signal, for example, through filtering, amplification and frequency downconversion, and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate of the downlink from the processor 155 and acquires data symbol estimates (i.e. estimates of the transmitted data symbols) by demodulating the received data symbols using the frequency response estimate. The Rx data processor 150 demodulates the data symbol estimates (i.e. performs symbol demapping), deinterleaves the demodulated data symbols and decodes the deinterleaved data symbols, thereby recovering the traffic data transmitted by the BS 105.

The operations of the symbol demodulator 145 and the Rx data processor 150 are complementary to the operations of the symbol modulator 120 and the Tx data processor 115 of the BS 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols and outputs a stream of the symbols to the transmitter 175. The transmitter 175 generates an uplink signal by processing the symbol stream and transmits the uplink signal to the BS 105 through the antenna 135.

The BS 105 receives the uplink signal from the UE 110 through the antenna 130. In the BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the BS 105. The processors 155 and 180 may be connected respectively to the memories 160 and 185 that store program code and data. The memories 160 and 185 store an operating system, applications, and general files in conjunction with the processors 155 and 180.

The processors 155 and 180 may also be called controllers, microcontrollers, microprocessors, or microcomputers.

The processors 155 and 180 may take various forms, for example, hardware, firmware, software, or a combination thereof. In a hardware configuration, the processors 155 and

180 may include Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention.

In a firmware or software configuration, the firmware or software may be implemented in the form of a module, a procedure, a function, etc. performing the functions or operations of the present invention. The firmware or software may be stored in the memories 160 and 185 and executed by the processors 155 and 180.

The layers of radio interface protocols between the UE and the BS may be classified into Layers 1, 2 and 3 (L1, L2 and L3) based on the three lowest layers of the Open System Interconnection (OSI) model. A physical layer corresponds to L1 and provides an information transmission service on physical channels. A Radio Resource Control (RRC) layer corresponds to L3 and provides radio control resources between the UE and a network. The UE and BS exchange RRC messages with a wireless communication network through the RRC layer.

The present invention determines what frequency resources to be allocated to a micro UE (or micro UEs), when the micro UE (or the micro UEs) is to share frequency resources with a plurality of macro UEs (or UEs) through spectrum sensing in an environment where frequency resource priority is given to the macro UEs.

Figure 2:
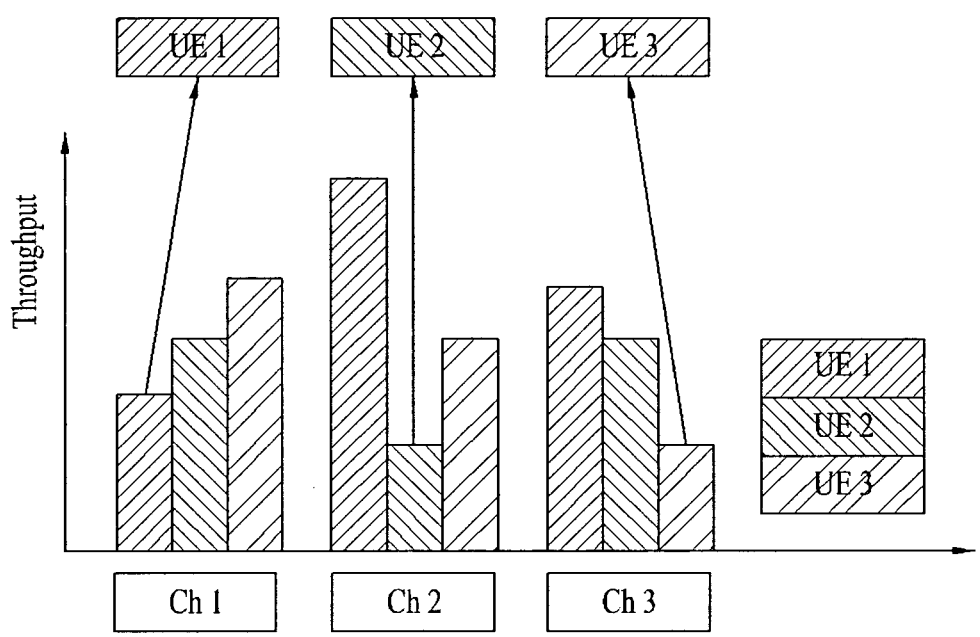
FIG. 2 illustrates exemplary resource allocation in an environment where a plurality of micro UEs hierarchically share the same frequency resources with a plurality of macro UEs through spectrum sensing.

FIG. 2 illustrates exemplary resource allocation in an environment where a plurality of micro UEs hierarchically share the same frequency resources with a plurality of macro UEs through spectrum sensing.

Referring to FIG. 2, frequency resources are labeled sequentially with channel numbers Ch 1, Ch 2 and Ch 3. Ch 1, Ch 2 and Ch 3 represent first, second and third frequency resources, respectively. Priority for using these frequency resources is given to macro UEs. If the frequency resources are sequentially assigned to micro UEs simply according to the channel numbers, taking no other factors into account, each micro UE may transmit a signal using the frequency resource allocated to the micro UE during a time when a macro UE does not use the frequency resource, detected through spectrum sensing. However, while allocation of frequency resources of a macrocell (or a macro BS) to micro UEs in a predetermined order may restrict interference with the macro UEs in each frequency resource and thus make co-existence viable between the micro UEs and the macro UEs, there are limitations in increasing the throughputs (hereinafter, throughput is called as data rates, data transmission rate, etc) of the micro UEs, while keeping interference between each micro UE and the macro UEs at a low level, because a different environment where each UE is placed in relation to using frequency resources is not considered.

Figure 3:
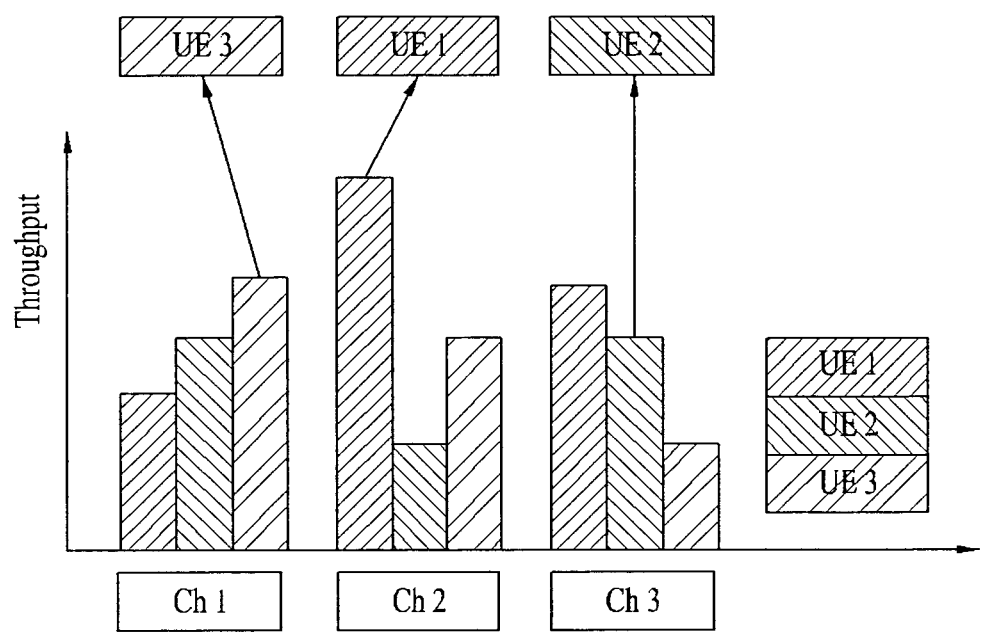
FIG. 3 illustrates throughputs which individual micro UEs using different frequency resources can achieve under a condition that interference caused to macro UEs using the frequency resources is maintained at or below a predetermined level.

FIG. 3 illustrates throughputs which individual micro UEs using different frequency resources can achieve under a condition that interference caused to macro UEs using the frequency resources is maintained at or below a predetermined level.

Referring to FIG. 3, a micro BS may allocate a different frequency resource to each micro UE in such a manner that the sum throughput (or sum of data rate) of the micro UE is maximized. According to this frequency resource allocation scheme, interference and throughput are affected by the performance of spectrum sensing, that is, spectrum sensing performance is proportional to throughput and inversely proportional to interference. This effect differs in each micro UE with respect to different frequency resources. In other words, each frequency resource has different channel gains for different UEs.

For example, on the assumption that three channels Ch 1, Ch 2 and Ch 3 are available and three micro UEs use them, as illustrated in FIG. 3, six cases of frequency resource allocation for the three micro UEs can be considered.

If on the assumption of the same interference for all of the micro UEs, UE 3, UE 2 and UE 1 have throughputs for Ch 1 in descending order, UE 1, UE 3 and UE 2 have throughputs for Ch 2 in descending order and UE 1, UE 2 and UE 3 have throughputs for Ch 3 in descending order, the micro BS allocates Ch 1 to UE 3, Ch 2 to UE 1 and CH 3 to UE 1 to maximize the throughput of each channel. However, although two channels are allocated to UE 1, no channel is allocated to UE 2. Hence, Ch 3 is allocated to UE 2 to thereby allocate at least one channel to each UE. In this manner, unfairness that frequency allocation might have is overcome and the sum throughput is also maximized.

When a micro UE shares frequency resources with a macro UE through spectrum sensing, interference that the micro UE causes to the macro UE and throughput that the micro UE can achieve are determined by the accuracy of spectrum sensing. The spectrum sensing accuracy of the micro UE is proportional to accuracy with which the micro UE can detect the presence of the macro UE. Therefore, the micro UE interferes with the macro UE less and detects the absence of the macro UE more accurately, thereby increasing the throughput of the micro UE.

As described above, since spectrum sensing is performed by use of an energy detector in the present invention, it is necessary to calculate the accuracy of spectrum sensing that a specific micro UE performs to detect a signal from a macro UE. For calculation of the accuracy of spectrum sensing, the following general situation is considered.

It is assumed that M frequency resources are available and M macro UEs use the M frequency resources, in a macro cell. From the viewpoint of a micro UE, as M increases, more frequency resources become available and the number of signal transmission opportunities increases. It is also assumed that there are N micro UEs in a microcell overlaid with the macrocell.

Each frequency resource has a bandwidth of W and a symbol period of $T_s$. Each macro UE has a different traffic model and the average idle period (hereinafter, idle period means specific period that signal is not transmitted by macro UE) and average busy period (hereinafter, busy period means specific period that signal is transmitted by macro UE) of an $m^{th}$ macro UE is $1/\lambda_m$ and $1/\mu_m$, respectively. $1/\mu_m$ and $1/\mu_m$ for each macro UE indicate the resource occupancy state of the macro UE. As $1/\lambda_m$ is greater, the macro UE does not use a frequency resource for long and as $1/\mu_m$ is greater, the macro UE occupies the frequency resource for long.

Figure 4:
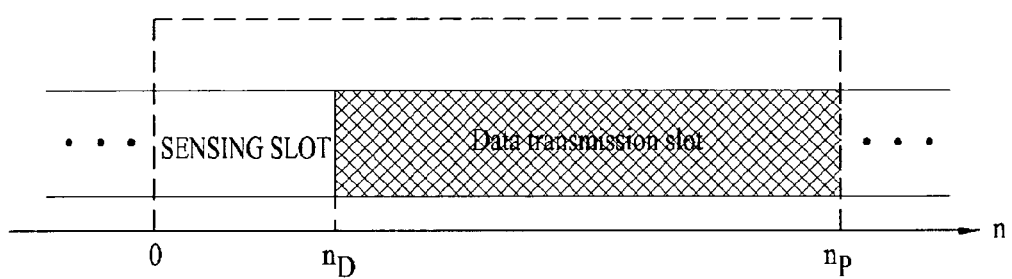
FIG. 4 illustrates an exemplary spectrum sensing and signal transmission structure for a micro UE.

FIG. 4 illustrates an exemplary spectrum sensing and signal transmission structure for a micro UE.

Referring to FIG. 4, each micro UE has a sensing-transmission structure in which the micro UE performs spectrum sensing in a sensing slot of $n_D$ samples and in the absence of a macro UE signal, transmits a signal in a data transmission slot. This sensing-transmission operation is repeated during a time period of $n_P$ samples. On the other hand, upon detection of a macro UE signal, the micro UE does not transmit a signal, thus avoiding interference. As $n_D$ increases and $n_P$ decreases, spectrum sensing lasts longer and takes place more often. As a result, the spectrum sensing is more accurate at the expense of data transmission time. On the contrary, if $n_D$ decreases and $n_P$ increases, spectrum sensing lasts for a shorter time and takes place less often. As a result, data transmission time increases while spectrum sensing becomes less accurate.

If the micro UE mistakes signal transmission from a macro UE for non-signal transmission from the macro UE due to a spectrum sensing error and thus transmits signals, signal collision occurs between the macro UE and the micro UE, causing interference. The probability of generating a spectrum sensing error is called misdetection probability. Detection and misdetection are in a complement relationship and thus a misdetection probability and a detection probability are added to a total probability of 1. Hence, a misdetection probability is calculated by subtracting the detection probability (the probability of reliably detecting the presence of a macro UE) from 1. As the detection probability increases, the misdetection probability decreases, thus reducing interference that the micro UE causes to the macro UE.

In the opposite case where the micro UE mistakes non-signal transmission from the macro UE for signal transmission from the macro UE and thus does not transmit signals, it may experience throughput loss because an available signal transmission opportunity is not utilized. The probability of generating this error is referred to as false alarm probability. As the false alarm probability decreases, the micro UE more effectively detects vacant spectrum unused by the macro UE and thus obtains more signal transmission opportunities, thereby increasing throughput. Accordingly, there exists a need to assess and enhance the performance of energy detection-based spectrum sensing in order to optimally allocate frequency resources.

As described above, the micro UE determines whether the macro UE is transmitting a signal or not by detecting the energy of the macro UE signal during a sensing slot period through an energy detector. To assess the performance of energy detection-based spectrum sensing, the following signals may be considered. First, let a signal that the macro UE transmits to an $n^{th}$ micro UE using an $m^{th}$ frequency resource be denoted by $p_{m,n}(k)$ where k is the index of a sample along the time axis at the micro UE. The signal $p_{m,n}(k)$ is added with noise $w_n(k)$ and the resulting signal $r_{m,n}(k)$ is received at the $n^{th}$ micro UE. For a case $H_0$ without a macro UE and a case $H_1$ with a macro UE, a detection problem may be defined as $$H_0 : r_{m,n}(k) = w_n(k)$$

$$H_1 : r_{m,n}(k) = p_{m,n}(k) + w_n(k) \quad [\text{Equation 1}]$$

In the case $H_0$ without a macro UE, the micro UE receives only noise. In the case $H_1$ with a macro UE, the micro UE receives both a macro UE signal and noise. Therefore, the purpose of the detection problem expressed as [Equation 1] is to determine from a received signal whether only noise is included (in the case $H_0$) or both a macro UE signal and noise are included (in the case $H_1$).

The probability distribution of the signal $p_{m,n}(k)$ follows a complex white Gaussian process (having a complex value and a normal distribution independent and uniform with respect to each dimension and time) and has a power value of $\sigma_{m,n}^{p\ 2}$. Since the strength of the signal to be detected increases with the power value $\sigma_{m,n}^{p\ 2}$ relative to the noise, signal detection is easy. When the transmission power or channel gain value of the macro UE increases, the power value $\sigma_{m,n}^{p\ 2}$ also increases.

When a macro signal is modeled as a signal experiencing fading or having a great Peak-to-Average Power Ratio (PAPR) like an Orthogonal Frequency Division Multiplexing (OFDM) signal, the macro signal is assumed to have an additive White Gaussian distribution. The noise $w_n(k)$ generated at the receiver of the micro UE is modeled as an Additive White Gaussian noise signal with a power value of $\sigma_n^{w2}$. As the noise power value $\sigma_n^{w2}$ increases, the strength of the noise becomes greater than that of the signal to be detected, which makes signal detection difficult. A main cause of noise is thermal noise at the receiver and has a unique value according to characteristics of the receiver. Hence, the noise is specific to the micro UE and is not related to the macro UE signal.

The micro UE obtains a received signal using [Equation 1] and calculates the energy of the received signal during the sensing slot period $n_D$. The energy is given as test statistics $T_{m,n}$ in [Equation 2]. The test statistics are a criterion used to determine the presence or absence of a macro UE signal. If the test statistics are greater than a preset threshold $\eta_{m,n}$, it is determined that a macro UE exists. On the other hand, the test statistics are less than the threshold $\eta_{m,n}$, it is determined that a macro UE does not exist.

$$T = \sum_{n=0}^{n_D - 1} |r_{m,n}(k)|^2 \underset{\mathcal{H}_0}{\overset{\mathcal{H}_1}{\gtreqless}} \eta_{m,n} \quad [\text{Equation 2}]$$

where $r_{m,n}(k)$ denotes the signal received at the $n^{th}$ micro UE in the $m^{th}$ frequency resource from the macro UE, $\eta_{m,n}$ denotes the preset threshold, $n_D$ denotes the sensing slot period, $H_0$ denotes the case without a macro UE and $H_1$ denotes the case with a macro UE.

Figure 5:
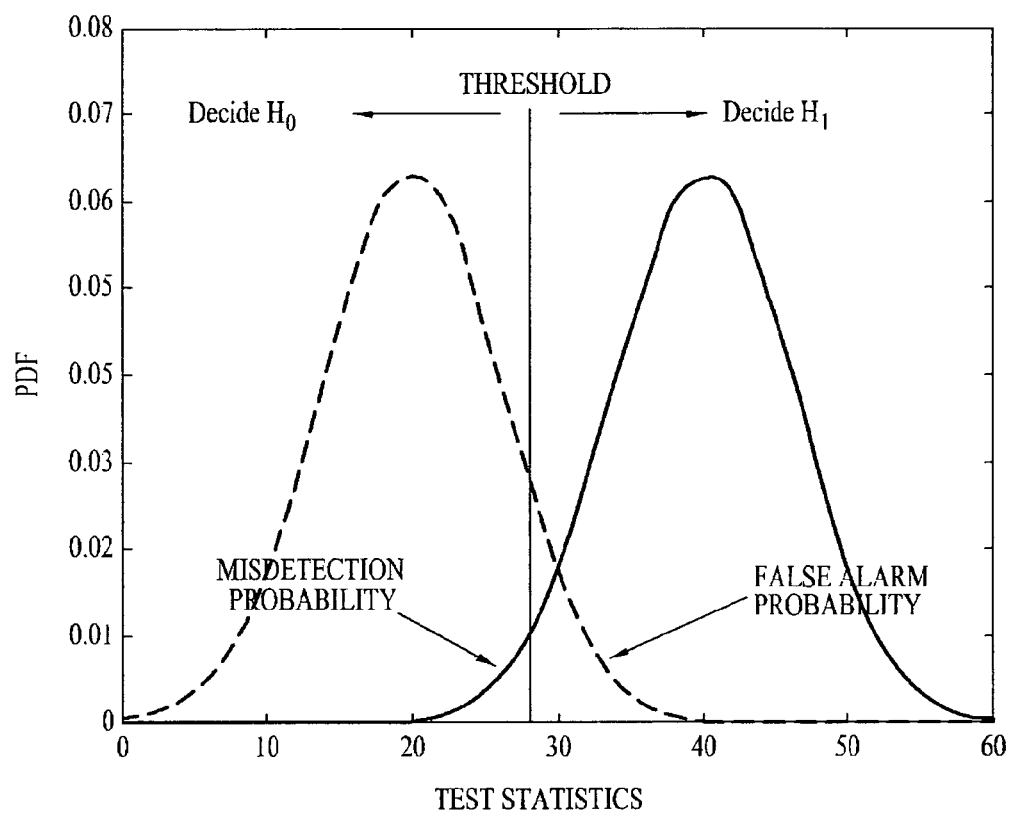
FIG. 5 is a graph illustrating a method for determining the presence or absence of a signal from a macro UE through energy detection.

FIG. 5 is a graph illustrating a method for determining the presence or absence of a signal from a macro UE through energy detection.

Referring to FIG. 5, a left dotted curve represents the case $H_0$ where a received signal includes only noise and a right solid curve represents the case $H_1$ where a received signal includes a macro UE signal and noise. A preset threshold may be used to determine whether a macro UE transmits a signal or not. The two curves overlap each other at the center of the graph, which means that detection errors have occurred. The detection errors are reflected in the misdetection probability of spectrum sensing (a probability equal to or less than the threshold on the right solid curve) and the false alarm probability of the spectrum sensing (a probability equal to or larger than the threshold on the left dotted curve). While both sensing errors may not be eliminated simultaneously, the two probabilities may be balanced by adjusting the threshold.

Specifically, if the threshold $\eta_{m,n}$ increases, the misdetection probability increases and the false alarm probability decreases. On the contrary, if the threshold $\eta_{m,n}$ decreases, the misdetection probability decreases and the false alarm probability increases. To calculate a detection probability $P_D^{m,n}$ and the false alarm probability $P_{FA}^{m,n}$ for a given threshold $\eta_{m,n}$, the test statistics of [Equation 2] are modeled probabilistically. In [Equation 2], the received signal $r_{m,n}(k)$ has a Gaussian distribution because the sum of Gaussian distributions is also a Gaussian distribution. Squared addition of the received signal leads to a Chi-square distribution. Hence, the detection problem of [Equation 1] is expressed as the following [Equation 3] using the test statistics.

$$H_0 : \frac{T_{m,n}}{\sigma_n^{w2}} \sim \chi^2_{2n_D} \quad [\text{Equation 3}]$$

$$H_1 : \frac{T_{m,n}}{\sigma_{m,n}^{p2} + \sigma_n^{w2}} \sim \chi^2_{2n_D}$$

where $\chi_m^2$ denotes an $m^{th}$-order Chi-square distribution, $T_{m,n}$ denotes the test statistics, $\sigma_{m,n}^{P\ 2}$ denotes the power value of a signal that the macro UE transmits to the $n^{th}$ micro UE in the $m^{th}$ frequency resource and $\sigma_n^{w2}$ denotes the power value of noise generated at the receiver of the $n^{th}$ micro UE.

Using [Equation 3], the false alarm probability $P_{FA}^{m,n}$ and the detection probability $P_D^{m,n}$ are determined by $$P_{FA}^{m,n} = Pr\{T_{m,n} > \eta_{m,n}; H_0\} = Q_{\chi_{2n_D}^2}\left(\frac{\eta_{m,n}}{\sigma_n^{w2}}\right) \quad \text{[Equation 4]}$$

$$P_D^{m,n} = Pr\{T_{m,n} > \eta_{m,n}; H_1\} = Q_{\chi_{2n_D}^2}\left(\frac{\eta_{m,n}}{\sigma_{m,n}^{p2} + \sigma_n^{w2}}\right) \quad \text{[Equation 5]}$$

where $Q_{\Phi_m^2}(\bullet)$ denotes the right tail probability of the $m^{th}$-order Chi-square distribution. If $n_D$ increases to 10 or more samples, the Chi-square distribution may be approximated to a Gaussian distribution using the central limit theorem. The approximation is expressed as $$H_0: T_{m,n} \sim N(2n_D\sigma_n^{w2}, 4n_D\sigma_n^{w4})$$

$$H_1: T_{m,n} \sim N(2n_D(\sigma_{m,n}^{P\ 2} + \sigma_n^{w2}), 4n_D(\sigma_{m,n}^{P\ 2} + \sigma_n^{w2})^2) \quad \text{[Equation 6]}$$

According to [Equation 6], the false alarm probability $P_{FA}^{m,n}$ and the detection probability $P_D^{m,n}$ may be calculated by $$P_{FA}^{m,n} = Q\left(\frac{\eta_{m,n} - 2n_D\sigma_n^{w2}}{\sqrt{4n_D}\ \sigma_n^{w2}}\right) = Q\left(\frac{\eta_{m,n}}{\sqrt{4n_D}\ \sigma_n^{w2}} - \sqrt{n_D}\right) \quad \text{[Equation 7]}$$

$$P_D^{m,n} = Q\left(\frac{\eta_{m,n} - 2n_D(\sigma_{m,n}^{p2} + \sigma_n^{w2})}{\sqrt{4n_D}\ (\sigma_{m,n}^{p2} + \sigma_n^{w2})}\right) = Q\left(\frac{\eta_{m,n}}{\sqrt{4n_D}\ (\sigma_{m,n}^{p2} + \sigma_n^{w2})} - \sqrt{n_D}\right) \quad \text{[Equation 8]}$$

where $Q(\bullet)$ denotes the Q-function of the Gaussian distribution, given as $$Q(x) = \frac{1}{\sqrt{2\pi}} \int_x^\infty e^{-t^2/2}\, dt \quad \text{[Equation 9]}$$

Since $Q(x)$ is a monotonically decreasing function with respect to x, as x increases, $Q(x)$ decreases. Therefore, as the threshold $\eta_{m,n}$ increases, the false alarm probability decreases in [Equation 7]. Also, as the threshold $\eta_{m,n}$ increases, the detection probability decreases, thus increasing the misdetection probability in [Equation 8].

Once the detection probability is calculated for the given threshold, the threshold may be adjusted based on the detection probability. To make sure that the macro UE can transmit signals reliably, it is necessary to calculate a threshold that leads to a target detection probability $P_D^t$. The threshold may be computed by [Equation 10]. The threshold $\eta_{m,n}$ computed by [Equation 10] always satisfies the target detection probability $P_D^t$.

$$\eta_{m,n} = 2(\sigma_{m,n}^{P2} + \sigma_n^{w2})(n_D + \sqrt{n_D}Q^{-1}(P_D^t)) \quad \text{[Equation 10]}$$

where $\sigma_{m,n}^{P\ 2}$ denotes the power value of a signal that the macro UE transmits to the $n^{th}$ micro UE in the $m^{th}$ frequency resource, $\sigma_n^{w2}$ denotes the power value of noise generated at the receiver of the $n^{th}$ micro UE, $n_D$ denotes the sensing slot period and $P_D^t$ denotes the target detection probability.

The threshold computed by [Equation 10] leads to the target detection probability and thus a false alarm probability may be calculated with respect to the target detection probability. Let's define the SNR of a signal from an $m^{th}$ macro UE at the $n^{th}$ micro UE as $\gamma_{m,n}^P = \sigma_{m,n}^{P\ 2}/\sigma_n^{w2}$. Then, the false alarm probability may be given as $$P_{FA}^{m,n} = Q(\sqrt{n_D}\gamma_{m,n}^P + (1+\gamma_{m,n}^P)Q^{-1}(P_D^t)) \quad \text{[Equation 11]}$$

Note that, given that the target detection probability $P_D^t$ is satisfied using [Equation 11] and the monotistically decreasing function property of $Q(x)$, the false alarm probability $P_{FA}^{m,n}$ decreases as a spectrum sensing time $\sqrt{n_D}$ or the SNR $\gamma_{m,n}^P$ increases.

As described above, as the false alarm probability decreases, the probability of using frequency resources unused by the macro UE increases. As a consequence, the throughput (or data transmission) of the micro UE may increase. In addition, because the threshold is set so that a detection probability is same or greater than predetermined value, interference caused to the macro UE may be maintained at or below a predetermined level. Accordingly, the throughput of the micro UE can be calculated through spectrum sensing when the micro UE transmits signals. The throughput refers to the throughput of the micro UE that is achieved by transmitting a signal without interference during a non-transmission time period of the macro UE, with the overhead from spectrum sensing not included.

Therefore, the throughput of the micro UE needs to be calculated, taking into account the ratio of the idle period of the macro UE to a total period of the macro UE and the ratio of the actual busy period of the macro UE to the total period of the macro UE. In addition, a case without false alarms, that is, the probability of the micro UE's accurately detecting non-transmission from the macro UE needs to be considered in calculating the throughput of the micro UE. By considering this probability, interference caused by imperfect sensing between the macro UE and the micro UE is factored in. As a result, when the macro BS allocates the $m^{th}$ frequency resource to the micro UE, the throughput of the micro UE can be calculated. Herein, the throughput of the micro UE to which the $m^{th}$ frequency resource is allocated may be computed using the idle-to-total period ratio of the macro UE $P_m^{Idle} = \mu_m/(\lambda_m + \mu_m)$ and the busy-to-total period ratio of the macro UE $$\frac{n_P - n_D}{n_P}$$

by [Equation 12]. The total period of the macro UE is the sum of its idle and busy periods.

$$c_{m,n} = P_m^{Idle}\frac{n_P - n_D}{n_P}(1 - P_{FA}^{m,n})C_{m,n} \quad \text{[Equation 12]}$$

where $1 - P_{FA}^{m,n}$ denotes a non-false alarm probability, specifically a probability of detecting the vacancy of the $m^{th}$ frequency resource by the $n^{th}$ micro UE, when the macro UE does not occupy the $m^{th}$ frequency resource. In this case, the $n^{th}$ micro UE can transmit a signal in the $m^{th}$ frequency resource without interference.

However, in the case where spectrum sensing can precede frequency allocation, such as spectrum sensing performed by a scheduler, the throughput of a micro UE may be re-defined such that only vacant frequency resources (channels) are allocated. If the micro BS can acquire a priori knowledge of a sensing spectrum result to allocate every sensing period $n_p$ based on the spectrum sensing result. The throughput of the micro UE may be defined as [Equation 13] depending on the presence or absence of a macro UE using the frequency resource, as detected through spectrum sensing. In this case, the throughput of the micro UE is not related to the false alarm probability. Since it is already known whether a spectrum is idle or busy through sensing, $P_m^{Idle}$ is 1 for the $m^{th}$ frequency resource that the $n^{th}$ micro UE determines as vacant and $P_m^{Idle}$ is 1 for the $m^{th}$ frequency resource that the $n^{th}$ micro UE determines to be occupied by the macro UE.

$$c_{m,n} = P_m^{Idle} \frac{n_P - n_D}{n_P} C_{m,n} \quad \text{[Equation 13]}$$

where $C_{m,n}$ denotes a channel capacity that the $n^{th}$ micro UE may achieve when transmitting a signal without interference through successful spectrum sensing of the $m^{th}$ frequency resource. The channel capacity $C_{m,n}$ is given as [Equation 14] according to Shannon's channel capacity theorem. To calculate the channel capacity $C_{m,n}$, the SNR of the $m^{th}$ frequency resource at the $n^{th}$ micro UE ($\gamma_{m,n}^s = \sigma_{m,n}^{s\,2}/\sigma_n^{w2}$) is used. The busy-to-total period ratio $$\frac{n_P - n_D}{n_P}$$

may be present.

$$C_{m,n} = \log_2(1 + \gamma_{m,n}^s), \quad \text{[Equation 14]}$$

It is noted from [Equation 14] that the channel capacity of the $n^{th}$ micro UE increases with the SNR $\gamma_n^s$.

As described before, the micro BS may allocate frequency resources of a macrocell to each micro UE in a manner that satisfies the condition of [Equation 15] in order to maximize the throughput computed by [Equation 13], while limiting interference to a predetermined level.

$$\max \sum_{m=0}^{M-1} \sum_{n=0}^{N-1} c_{m,n} x_{m,n} \quad \text{[Equation 15]}$$

$$\text{s.t.} \sum_{m=0}^{M-1} x_{m,n} \leq 1, \quad n = 1, \ldots, N$$

$$\sum_{n=0}^{N-1} x_{m,n} \leq 1, \quad m = 1, \ldots, M$$

$$x_{m,n} \geq 0, \quad \forall m, n$$

where $x_{m,n}$ is a variable indicating whether a frequency resource is allocated. If $x_{m,n}=1$, this means that the $m^{th}$ frequency resource is allocated to the $n^{th}$ micro UE. If $x_{m,n}=0$, this means that the $m^{th}$ frequency resource is not allocated to the $n^{th}$ micro UE.

As defined in [Equation 12] or [Equation 13], $c_{m,n}$ is a maximum throughput that can be achieved, while satisfying an interference constraint for the macro UE using the $m^{th}$ frequency resource, when the $m^{th}$ frequency resource is allocated to the $n^{th}$ micro UE. Thus, the objective function in the first row of [Equation 15], $$\sum_{m=0}^{M-1} \sum_{n=0}^{N-1} c_{m,n} x_{m,n}$$

is a sum throughput for all cases where the $m^{th}$ frequency resource is allocated to the $n^{th}$ micro UE. Preferably, the micro BS allocates a frequency resource to a micro UE so as to maximize sum throughput. The constraint $$\sum_{m=0}^{M-1} x_{m,n} \leq 1$$

in the second row of [Equation 15] means that only one frequency resource should be allocated to each micro UE. The constraint $$\sum_{n=0}^{N-1} x_{m,n} \leq 1$$

in the third row of [Equation 15] means that only one micro UE should be allocated to each frequency resource. The constraint $x_{m,n} \geq 0$ in the last row means that only one of both cases of frequency resource allocation ($x_{m,n}=1$) and non-frequency allocation ($x_{m,n}=0$) should be satisfied in conjunction with the above two constraints.

Frequency resource allocation that satisfies the condition of [Equation 15] may maximize the sum throughput of a micro UE, while limiting interference of the micro UE to or below a predetermined level. The defined frequency resource allocation problem is classified as Linear Programming (LP), particularly as Binary Integer Programming (BIP). The frequency resource allocation problem can be solved by a general auction algorithm or Hungarian algorithm.

The auction algorithm is based on the following principle. In a real auction, a price is determined for reasonable resource allocation. The resource allocation is carried out such that the price maximizes the difference between the profits and costs of individuals participating in an auction. The auction algorithm involves the following two phases, bidding phase and assignment phase.

In the bidding phase, different prices are assigned to individual resources (frequency resources) and some of the resources are allocated to UEs. UEs to which resources have not been allocated bid for their best resources (i.e. resources that maximize a value obtained by subtracting a cost from a profit and are willing to accept low prices). Herein, a price is determined to be the difference between the profit of a best resource and the profit of a second-best resource.

In the assignment phase, all resources are assigned to lowest bidders. Each resource matches the lowest bid. At the same time, the UEs to which resources were allocated return the resources.

The Hungarian algorithm proceeds as follows. For example, given four UEs and four frequency resources, the utility of allocating one resource to each UE is calculated and the utilities are arranged in a matrix.

$$\begin{bmatrix} a1 & a2 & a3 & a4 \\ b1 & b2 & b3 & b4 \\ c1 & c2 & c3 & c4 \\ d1 & d2 & d3 & d4 \end{bmatrix} \quad \text{[Equation 16]}$$

where a, b, c and d denote the UEs, 1, 2, 3 and 4 denote the resources and a1, a2, a3 and a4 denote allocation of the resources 1, 2, 3 and 4 to UE a.

In Step 1, a row operation is performed on the matrix. Specifically, a minimum value is subtracted from the values in each row. After this operation is performed row by row, one zero exists in each row. Thus, the entire matrix is given as $$\begin{bmatrix} 0 & a2' & a3' & a4' \\ b1' & b2' & b3' & 0' \\ 0' & c2' & c3' & c4' \\ d1' & 0' & d3' & d4' \end{bmatrix} \quad \text{[Equation 17]}$$

In Step 2, all unassigned rows are marked and then all non-zero columns in the unassigned rows are marked. Subsequently, all rows assigned to the columns are marked. The resulting matrix is expressed as $$\times \begin{bmatrix} 0 & a2' & a3' & a4' \\ b1' & b2' & b3' & 0' \\ 0' & c2' & c3' & c4' \\ d1' & 0' & d3' & d4' \end{bmatrix} \begin{matrix} \\ \times \\ \\ \times \end{matrix} \quad \text{[Equation 18]}$$

The above operation is repeated until resources can be allocated. Thus the minimum number of row and/or column having zeroes is maximized and thus optimal resource allocation is possible.

The auction algorithm and the Hungarian algorithm have been described above, which can be used to allocate frequency resources such that the sum throughput of a micro UE is maximized, while interference with macro UEs is limited to or below a predetermined level.

Now a description is given of methods for allocating resources to each micro UE in a micro eNodeB under various scenarios in a hierarchical cellular mobile communication system. While the resource allocation methods are also applicable to a general wireless communication environment, the following description is given in the context of downlink and uplink in a hierarchical cell structure, for to aid in understanding of the present invention.

In the hierarchical cell structure, a macro eNodeB serving as a BS exists at the center of a macrocell and one or more macro UEs may be located within the macro cell. All macro UEs communicate with the macro eNodeB via links. It is assumed herein that M frequency resources are available to the macrocell and each frequency resource is used for one macro UE.

The macrocell is overlaid with micro cells inside the macro cell. A micro eNodeB serving as a BS and micro UEs serving as UEs are present in each micro cell and all micro UEs may communicate with the micro eNodeB via links. It is assumed that there are N micro UEs in a microcell and each of the micro UEs can access one frequency resource of the macrocell through spectrum sensing. It is also assumed that control channels are established between the macro eNodeB and the macro UEs and between the micro eNodeB and the micro UEs and information is collected and resource allocation information is transmitted between the macro eNodeB and the macro UEs via the macro control channels and between the micro eNodeB and the micro UEs via the micro control channels.

However, it is not assumed that information is transmitted on a control channel between a macrocell device (a macro eNodeB or a macro UE) and a microcell device (a micro eNodeB or a micro UE).

Four scenarios in total can be considered out of two modes, that is, a downlink and an uplink for each of the macrocell and the microcell, 1) macro uplink-micro uplink 2) macro downlink-micro uplink 3) macro uplink-micro downlink and 4) macro uplink-micro uplink.

The following are considered in determining an entity that will perform spectrum sensing. A transmitter or receiver of a micro UE can detect a signal generated from a transmitter of a macro UE. In the case where the micro UE receiver performs spectrum sensing, the micro UE transmitter needs to notify the micro UE receiver that it will transmit a signal, when the micro UE is to transmit a signal. Then the micro UE receiver notifies the micro UE transmitter of the result of spectrum sensing indicating whether any of the macro UEs is transmitting a signal. Then the micro UE transmitter may transmit a signal based on the spectrum sensing result.

In the case where the micro UE transmitter performs spectrum sensing, it determines whether any of the macro UEs is transmitting a signal and transmits based on the determination. Compared to the spectrum sensing of the micro UE receiver, the spectrum sensing and transmission process may be simplified and the overhead resulting from unnecessary control signal transmission between the transmitter and receiver of the micro UE may be reduced. The following description is given in consideration of the fact that the micro UE transmitter is responsible for spectrum sensing.

Scenario 1: Macrocell: Uplink-Microcell: Uplink

Figure 6:
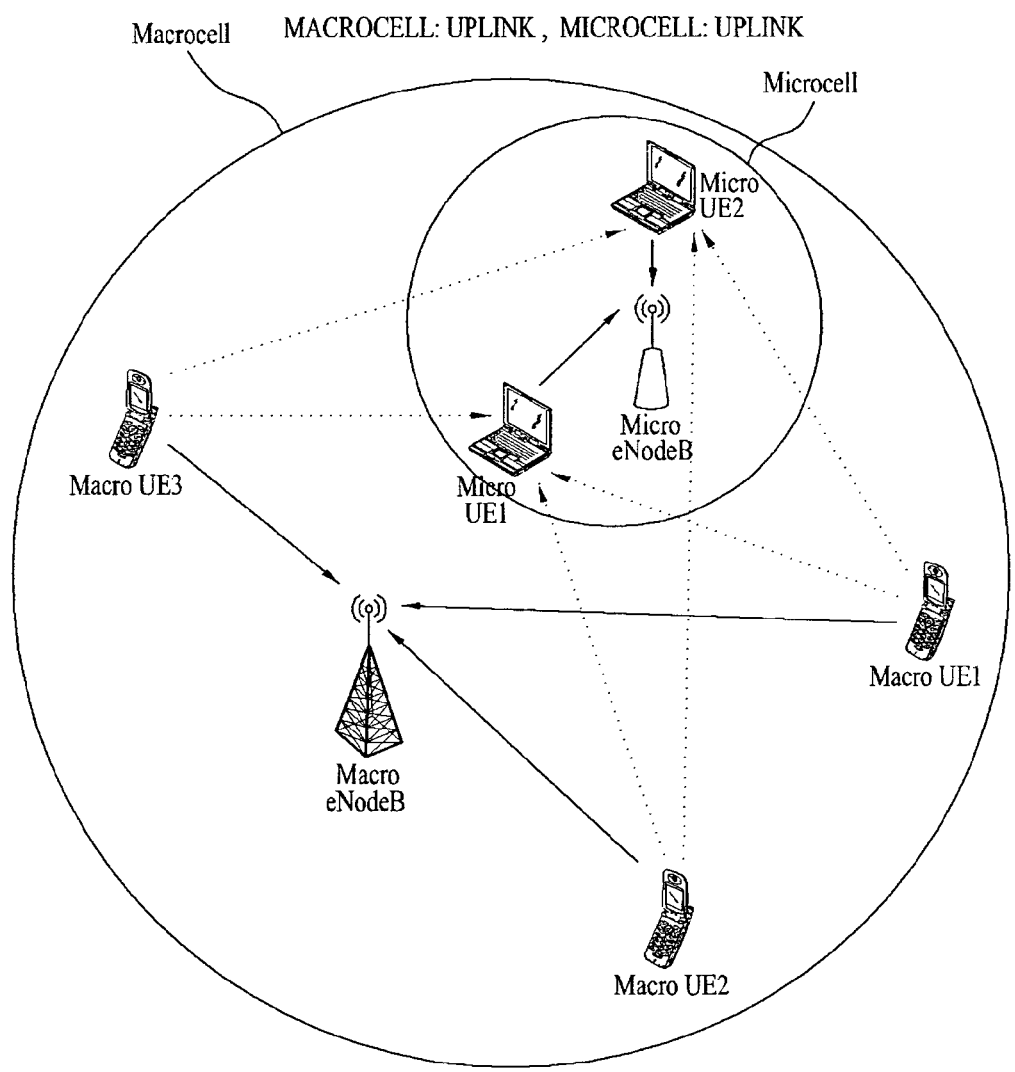
FIG. 6 illustrates a signal transmission relationship in a first scenario where both a macrocell and a microcell operate on uplinks in a hierarchical cell structure.

FIG. 6 illustrates a signal transmission relationship in a first scenario where both a macrocell and a microcell operate on uplinks in a hierarchical cell structure.

Referring to FIG. 6, three macro UEs and two micro UEs are present (M=3 and N=2) in the hierarchical cell structure, by way of example. Since the macrocell operates on the uplink, each macro UE transmits an uplink signal to a macro eNodeB. In the illustrated case of FIG. 6, Macro UE1, Macro UE2 and Macro UE3 transmit uplink signals to the macro eNodeB. The microcell also operates on the uplink and thus each micro UE transmits an uplink signal to a micro eNodeB. In FIG. 6, Micro UE1 and Micro UE2 may transmit uplink signals to the micro eNodeB.

In FIG. 6, solid lines indicate links from the macro UEs to the macro eNodeB and links from the micro UEs to the micro eNodeB. Although the macro UEs can use allocated frequency resources at any time, the micro UEs should borrow the frequency resources from the macro UEs. Hence, the micro UEs perform spectrum sensing on signals received from the macro UEs before transmitting signals. In FIG. 6, Micro UE1 and Micro UE2 each detect signals from Macro UE1, Macro UE2 and Macro UE3 through spectrum sensing. Links via which the micro UEs receive the signals from the macro UEs are indicated by dotted lines.

Figure 7:
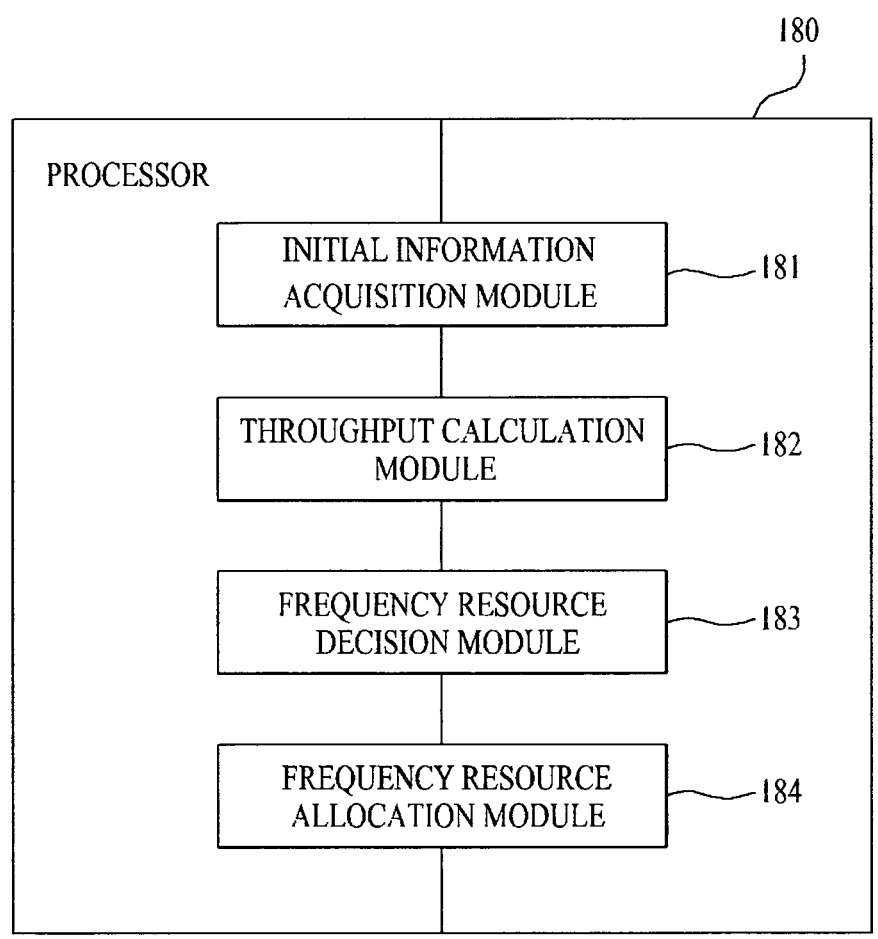
FIG. 7 is a block diagram of a processor in a micro BS according to the present invention.

FIG. 7 is a block diagram of a processor in the micro eNodeB according to the present invention.

Referring to FIG. 7, a processor 180 of the micro eNodeB may include an initial information acquisition module 181, a throughput calculation module 182, a frequency resource decision module 183 and a frequency resource allocation module 184.

The micro eNodeB may collect system information about the macro UEs during microcell initialization. Specifically, the initial information acquisition module 181 may receive information about traffic of each macro UE in a frequency resource allocated to the macro UE, information about the SNR of a signal from each macro UE, measured at each micro UE, and information about the SNR of a signal from each micro UE, measured at each micro eNodeB. The information about traffic of each macro UE refers to information about traffic transmitted in the frequency resource allocated to the each macro UE. The traffic information of each macro UE may include information $\{\lambda_m\}$ about a packet arrival rate (e.g. information about an average arrival rate) of packets of the each macro UE), expressed in the form of a vector. The traffic information of the each macro UE may further include information $\{\mu_m\}$ about a service rate of packets of the each macro UE (e.g. information about an average service rate of packets of the macro UE) expressed in the form of a vector.

The SNRs of signals from the macro UEs measured at each micro UE may be expressed as an SNR matrix $\{\gamma_{m,n}^p\}$ and the SNRs of signals from the micro UEs measured at each micro eNodeB may be expressed as an SNR matrix $\{\gamma_{m,n}^s\}$. The initial information acquisition module 181 may receive control information such as the SNR matrix $\{\gamma_{m,n}^p\}$ from the micro UEs on micro control channels. Due to frequency selective fading and position differences, m frequency resources have different SNRs.

The throughput calculation module 182 calculates a throughput $C_{m,n}$ that an $n^{th}$ micro UE can achieve, satisfying a given interference constraint, when the $n^{th}$ micro UE shares a frequency resource used by an $m^{th}$ macro UE, using the information collected by the initial information acquisition module 181, $\{\lambda_m\}$, $\{\mu_m\}$, $\{\gamma_{m,n}^p\}$ and $\{\gamma_{m,n}^s\}$ according to [Equation 12].

Referring to $$c_{m,n} = P_m^{Idle} \frac{n_P - n_D}{n_P}(1 - P_{FA}^{m,n})C_{m,n}$$

expressed as [Equation 12], the throughput calculation module 182 may calculate $P_m^{Idle}$ using $\{\lambda_m\}$ and $\{\mu_m\}$ (i.e. $P_m^{Idle} = \mu_m/(\mu_m+\lambda_m)$). The busy-to-total period ratio $$\frac{n_P - n_D}{n_P}$$

may be preset in [Equation 12]. The throughput calculation module 182 may calculate the false alarm probability $P_{FA}^{m,n}$ using $\{\gamma_{m,n}^p\}$ according to [Equation 9]

$$\left(Q(x) = \frac{1}{\sqrt{2\pi}} \int_x^\infty e^{-t^2/2} dt\right) \quad \text{[Equation 9]}$$

and [Equation 11]

$$\left(P_{FA}^{m,n} = Q(\sqrt{n_D}\, \gamma_{m,n}^p + (1 + \gamma_{m,n}^p)Q^{-1}(P_D))\right). \quad \text{[Equation 11]}$$

The throughput calculation module 182 may calculate a channel capacity that the $n^{th}$ micro UE can achieve, when the $n^{th}$ micro UE transmits a signal without interference through successful spectrum sensing in the $m^{th}$ frequency resource, using $\{\gamma_{m,n}^s\}$ according to [Equation 14].

The throughput calculation module 182 may calculate the throughput of each micro UE according to [Equation 12], using the idle-to-total period ratio of a macro UE $P_m^{Idle} = \mu_m/(\lambda_m+\mu_m)$, the busy-to-total period ratio of the macro UE $$\frac{n_P - n_D}{n_P}$$

the channel capacity and false alarm probability of the micro UE.

The frequency resource decision module 183 may determine a frequency resource to be allocated to each micro UE based on the throughputs of the micro UEs, in such a manner that the throughputs of the micro UEs are maximized while limiting interference from the macro UEs to or below a predetermined level.

In determining the frequency resources to be allocated to the micro UEs, the frequency resource decision module 183 satisfies the condition expressed as $$\max \sum_{m=0}^{M-1} \sum_{n=0}^{N-1} c_{m,n} x_{m,n} \quad \text{[Equation 15]}$$

$$\text{s.t.} \quad \sum_{m=0}^{M-1} x_{m,n} \leq 1, \quad n = 1, \ldots, N$$

$$\sum_{n=0}^{N-1} x_{m,n} \leq 1, \quad m = 1, \ldots, M$$

$$x_{m,n} \geq 0, \quad \forall\, m, n$$

where $x_{m,n}$ is a variable indicating whether a frequency resource is allocated to a micro UE. If $x_{m,n}=1$, this means that the $m^{th}$ frequency resource is allocated to the $n^{th}$ micro UE. If $x_{m,n}=0$, this means that the $m^{th}$ frequency resource is not allocated to the $n^{th}$ micro UE. As defined in [Equation 12] or [Equation 13], $c_{m,n}$ is a maximum throughput that can be achieved, while satisfying an interference constraint for the macro UE using the $m^{th}$ frequency resource, when the $m^{th}$ frequency resource is allocated to the $n^{th}$ micro UE. Thus, the objective function in the first row of [Equation 15], $$\sum_{m=0}^{M-1} \sum_{n=0}^{N-1} c_{m,n} x_{m,n}$$

is a sum throughput for all cases where the $m^{th}$ frequency resource is allocated to the $n^{th}$ micro UE. Preferably, the micro eNodeB allocates a frequency resource to a micro UE so as to maximize the sum throughput. The constraint $$\sum_{m=0}^{M-1} x_{m,n} \leq 1$$

in the second row of [Equation 15] is that only one frequency resource at most should be allocated to each micro UE. The constraint $$\sum_{n=0}^{N-1} x_{m,n} \le 1$$

in the third row of [Equation 15] means that only one micro UE should be allocated to each frequency resource. The constraint $x_{m,n} \ge 0$ in the last row means that only one of both cases of frequency resource allocation ($x_{m,n}=1$) and non-frequency allocation ($x_{m,n}=0$) should be satisfied in conjunction with the above two constraints.

The frequency resource decision module 183 may represent information about the frequency resources determined by the auction algorithm or the Hungarian algorithm that solves the optimization problem defined as [Equation 15], as a frequency resource allocation matrix $\{x_{m,n}\}$. The auction algorithm or the Hungarian algorithm has already been described.

The frequency resource allocation module 184 allocates the frequency resources decided by the frequency resource decision module 183 to the micro UEs. The transmitter 125 transmits information about the allocated frequency resources to the micro UEs.

Then a micro UE performs spectrum sensing on an allocated frequency resource. In the absence of a signal from a macro UE to which the frequency resource was allocated, the micro UE transmits an uplink signal to the micro eNodeB. In this manner, spectrum sensing and signal transmission are repeated. If the environment is changed, optimized frequency resource allocation is discontinued. Therefore, the frequency resource decision module 183 needs to decide an optimum frequency resource to be allocated to each micro UE by updating the SNR matrices $\{\gamma_{m,n}^p\}$ and $\{\gamma_{m,n}^s\}$. The frequency resource decision module 183 may update the SNR matrices often or less often. For example, in case of TV white space, the state of each TV channel changes slowly and thus an information update period is lengthened. On the other hand, fading characteristics change rapidly in a mobile environment where UEs travel at high speed. To handle rapid fluctuation in fading characteristics, a short information update period is needed. In this manner, the frequency resource decision module 183 may update the SNR matrices $\{\gamma_{m,n}^p\}$ and $\{\gamma_{m,n}^s\}$ in a period suitable for the environment of UEs.

Figure 8:
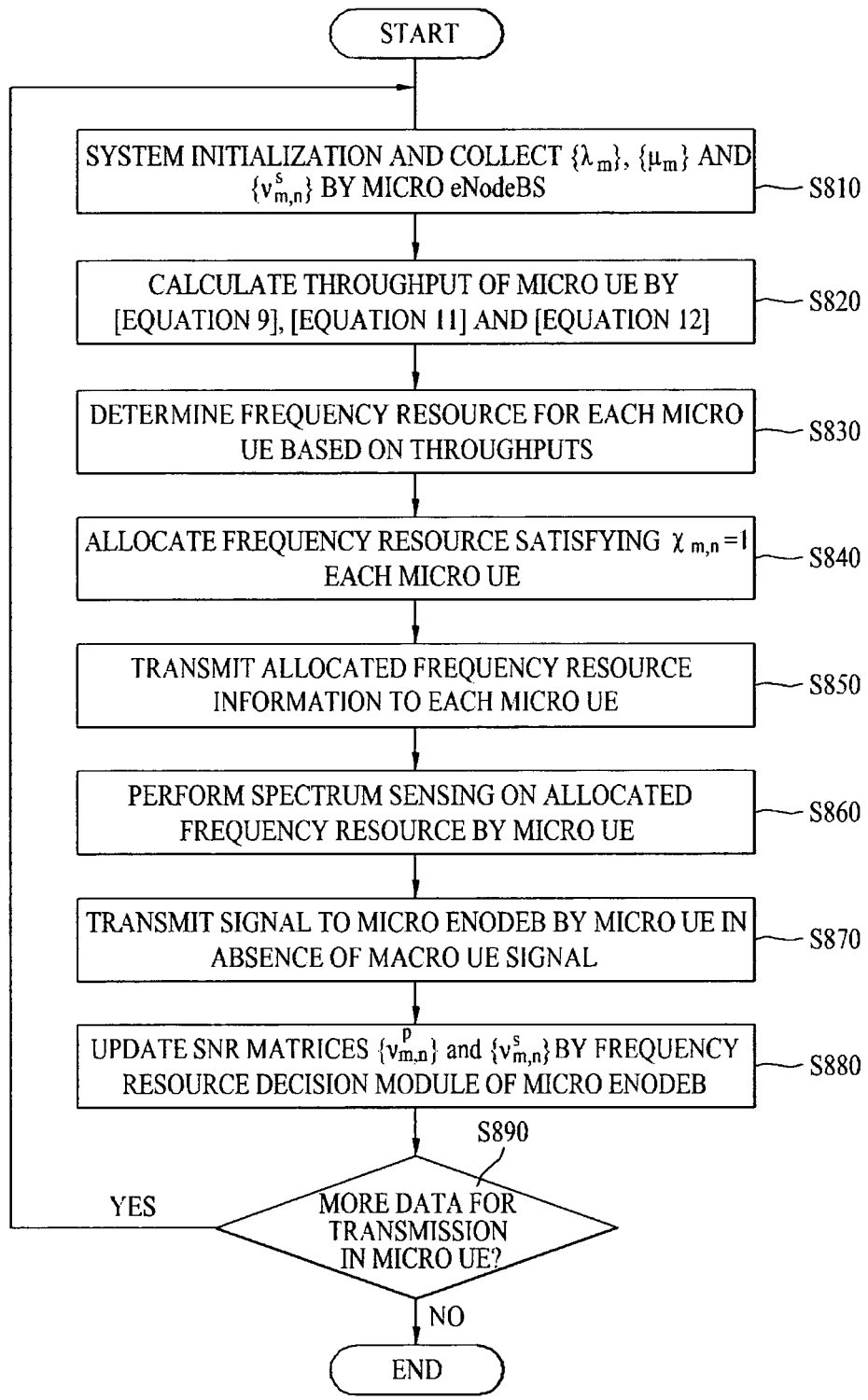
FIG. 8 is a flowchart illustrating operations of a micro BS and a micro UE in the first scenario according to the present invention.

FIG. 8 is a flowchart illustrating operations of a micro eNodeB and a micro UE in the first scenario according to the present invention.

Referring to FIG. 8, the micro eNodeB may collect system information about macro UEs, $\{\lambda_m\}$, $\{\mu_m\}$, $\{\gamma_{m,n}^p\}$, and $\{\gamma_{m,n}^s\}$ during microcell initialization in step S810. In step S820, the throughput calculation module 182 of the micro eNodeB calculates the throughput of each micro UE using [Equation 9], [Equation 11] and [Equation 12]. The frequency resource decision module 183 may determine a frequency resource to be allocated to each micro UE based on the calculated throughputs in step S830. Information about the determined frequency resources may be expressed as a frequency resource allocation matrix $\{x_{m,n}\}$. The frequency allocation module 184 allocates a frequency resource satisfying $x_{m,n}=1$ to each micro UE in step S840. In step S850, the transmitter 190 may transmit information about the allocated frequency resources (e.g. in the form of a frequency resource allocation matrix) to each micro UE.

Then the micro UE performs spectrum sensing on the allocated frequency resource based on the received frequency resource allocation information in step S860. Upon detecting the absence of a signal transmitted by a macro UE having priority to use the frequency resource through spectrum sensing, the micro UE transmits an uplink signal to the micro eNodeB in step S870.

In step S880, the frequency resource decision module 183 may update the SNR matrices $\{\gamma m,n^p\}$ and $\{\gamma_{m,n}^s\}$. The micro eNodeB determines whether the micro UE has any more data to be transmitted in step S890. If any transmission data remains to be transmitted in the micro UE, the micro eNodeB returns to step S820.

Scenario 2: Macrocell: Downlink-Microcell: Uplink

Figure 9:
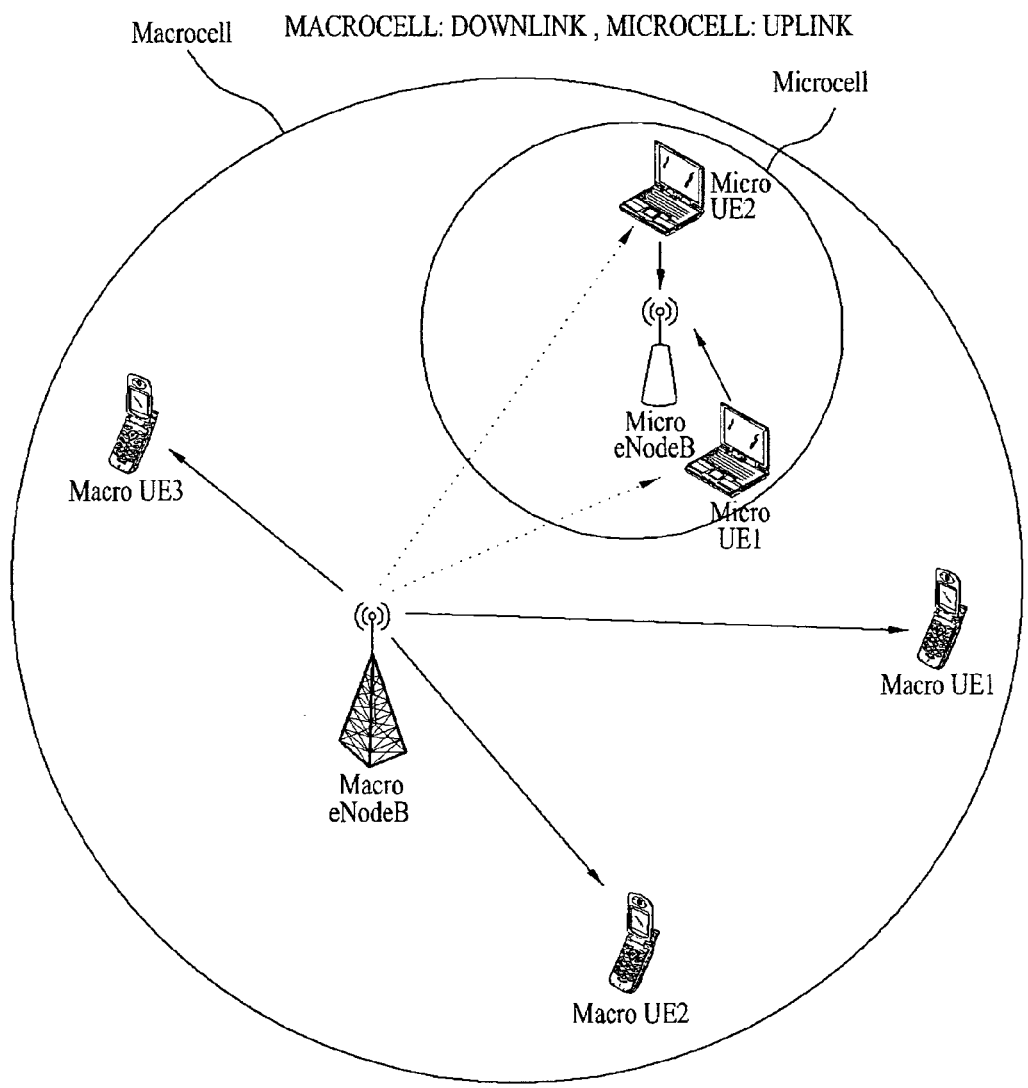
FIG. 9 illustrates a signal transmission relationship in a second scenario where a macrocell operates on a downlink and a microcell operates on an uplink in the hierarchical cell structure.

FIG. 9 illustrates a signal transmission relationship in a second scenario where a macrocell operates on a downlink and a microcell operates on an uplink in the hierarchical cell structure.

Referring to FIG. 9, three macro UEs and two micro UEs are present (M=3 and N=2) as in FIG. 6, by way of example. Since the macrocell operates on the downlink, a macro eNodeB transmits a downlink signal to each macro UE. In the illustrated case of FIG. 9, the macro eNodeB transmits downlink signals to Macro UE1, Macro UE2 and Macro UE3. The microcell operates on the uplink and thus each micro UE transmits an uplink signal to a micro eNodeB. In FIG. 9, Micro UE1 and Micro UE2 may transmit uplink signals to the micro eNodeB.

Solid lines indicate links from the macro eNodeB to the macro UEs and links from the micro UEs to the micro eNodeB. Although the macro eNodeB can use its frequency resources at any time, the micro UEs should borrow the frequency resources from the macro eNodeB. Hence, the micro UEs perform spectrum sensing on signals received from the macro eNodeB before transmitting signals. In the illustrated case of FIG. 9, Micro UE1 and Micro UE2 each detect a signal from the macro eNodeB through spectrum sensing. Links via which the micro UEs receive the signal from the macro eNodeB are indicated by dotted lines. Because the frequency resources of the macrocell are distinguished in the frequency domain, each micro UE has a different SNR given different frequency resources.

The micro eNodeB and a micro UE operate in the second scenario in a similar manner to the first scenario. Before the microcell starts to operate, the micro eNodeB may collect system information from the macro eNodeB during microcell initialization. Specifically, the initial information acquisition module 181 may receive information about traffic of each macro UE in a frequency resource allocated to the each macro. UE, $\{\lambda_m\}$ and $\{\mu_m\}$, information about the SNR of a signal from the macro eNodeB, measured at each micro UE, $\{\gamma_{m,n}^p\}$ and information about the SNR of a signal from each micro UE, measured at each micro eNodeB, $\{\gamma_{m,n}^s\}$. The second scenario is different from the first scenario in that $\{\gamma_{m,n}^p\}$ is the information about the SNR of a signal from the macro eNodeB, measured at each micro UE because the macrocell operates on the downlink. Due to frequency selective fading, each frequency resource has a different SNR.

As described before with reference to the first scenario, the throughput calculation module 182 calculates a throughput $c_{m,n}$ that an $n^{th}$ micro UE can achieve, satisfying a given interference constraint, when the $n^{th}$ micro UE shares a frequency resource used by an $m^{th}$ macro UE, using the information collected by the initial information acquisition module 181 $\{\lambda_m\}$, $\{\mu_m\}$, $\{\gamma_{m,n}^p\}$ and $\{\gamma_{m,n}^s\}$ according to [Equation 12].

The frequency resource decision module 183 may determine a frequency resource to be allocated to each micro UE based on the throughputs of the micro UEs, in such a manner that the throughputs of the micro UEs are maximized while limiting interference from the macro eNodeB to or below a predetermined level.

In determining the frequency resources to be allocated to the micro UEs, the frequency resource decision module 183 satisfies the condition expressed by [Equation 15].

The frequency resource allocation module 184 allocates the frequency resources decided by the frequency resource decision module 183 to the micro UEs. The transmitter 125 transmits information about the allocated frequency resources to the micro UEs.

Then a micro UE performs spectrum sensing on an allocated frequency resource. In the absence of a signal from a macro UE to which the frequency resource was allocated, the micro UE transmits an uplink signal to the micro eNodeB. In this manner, spectrum sensing and signal transmission are repeated. If the environment changes, optimized frequency resource allocation is discontinued. Therefore, the frequency resource decision module 183 needs to decide an optimum frequency resource to be allocated to each micro UE by updating the SNR matrices $\{\gamma_{m,n}^{p}\}$ and $\{\gamma_{m,n}^{s}\}$. The frequency resource decision module 183 may update the SNR matrices often or less often. For example, in case of TV white space, the state of each TV channel changes slowly and thus an information update period is lengthened. On the other hand, fading characteristics change rapidly in a mobile environment where UEs travel at high speed. To handle rapid fluctuation in fading characteristics, a short information update period is needed. In this manner, the frequency resource decision module 183 may update the SNR matrices $\{\gamma_{m,n}^{p}\}$ and $\{\gamma_{m,n}^{s}\}$ in a period suitable for the environment of UEs.

In the second scenario, the micro eNodeB and the micro UE operate in the same manner as the procedure of FIG. 8 in the first scenario.

Scenario 3: Macrocell: Uplink-Microcell: Downlink

Figure 10:
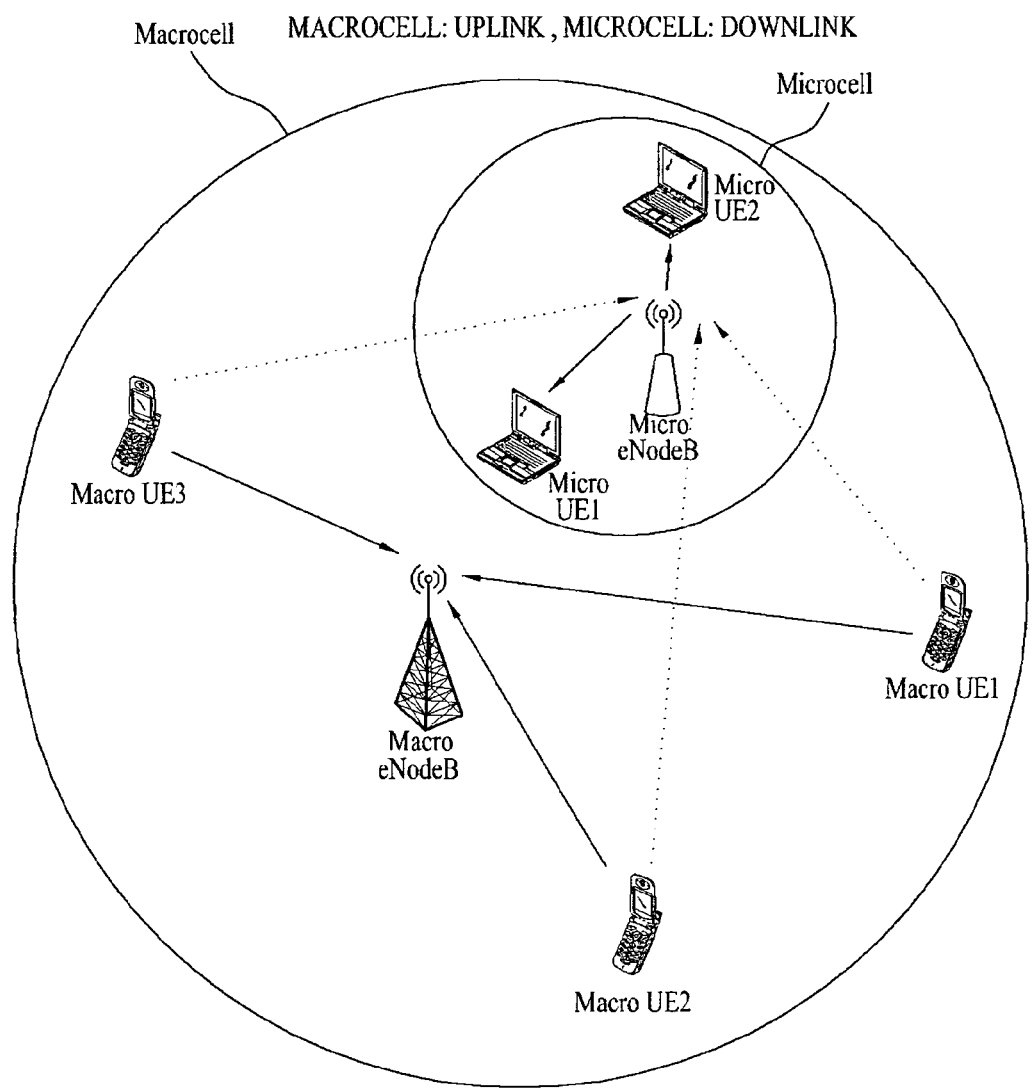
FIG. 10 illustrates a signal transmission relationship in a third scenario where a macrocell operates on an uplink and a microcell operates on a downlink in the hierarchical cell structure.

FIG. 10 illustrates a signal transmission relationship in a third scenario where a macrocell operates on an uplink and a microcell operates on a downlink in the hierarchical cell structure.

Referring to FIG. 10, three macro UEs and two micro UEs are present (M=3 and N=2) as in FIG. 6, by way of example. Since the macrocell operates on the uplink, each macro UE transmits an uplink signal to a macro eNodeB. In the illustrated case of FIG. 10, Macro UE1, Macro UE2 and Macro UE3 transmit uplink signals to the macro eNodeB. The microcell operates on the downlink and thus may transmit a signal to each micro UE.

In FIG. 10, solid lines indicate links from the macro UEs to the macro eNodeB and links from the micro eNodeB to the micro UEs. Although the macro UEs can use frequency resources allocated thereto at any time, the micro eNodeB should borrow the frequency resources from the macro UEs. Hence, the micro eNodeB performs spectrum sensing on signals received from the macro UEs before transmitting signals.

In the case illustrated in FIG. 10, the micro eNodeB detects signals from Macro UE1, Macro UE2 and Macro UE3 through spectrum sensing. Links via which the micro eNodeB receives the signals from the macro UEs are indicated by dotted lines. Because the frequency resources of the macrocell are distinguished in the frequency domain, each micro UE has a different SNR with respect to each frequency resource.

The micro eNodeB and a micro UE operate in the third scenario in a similar manner to in the first scenario.

Before the microcell starts to operate, the micro eNodeB may collect system information from macro UEs during microcell initialization. Specifically, the initial information acquisition module 181 may receive information $\{\lambda_m\}$ and $\{\mu_m\}$ about traffic of each macro UE in a frequency resource allocated to the macro UE and information $\{\gamma_{m,n}^{s}\}$ about the SNR of a signal from each micro eNodeB, measured at each micro UE. Due to frequency selective fading, each frequency resource may have a different SNR.

The throughput calculation module 182 calculates a throughput $c_{m,n}$ that an $n^{th}$ micro UE can achieve, satisfying a given interference constraint, when the $n^{th}$ micro UE shares a frequency resource used by an $m^{th}$ macro UE, using the information collected by the initial information acquisition module 181 $\{\lambda_m\}$, $\{\mu_m\}$ and $\{\gamma_{m,n}^{s}\}$ by [Equation 12]. The microcell operates on the downlink and the micro eNodeB performs spectrum sensing and frequency resource allocation in the third scenario. Therefore, the micro eNodeB has prior knowledge of channels used by the macro UEs, when allocating frequency resources. Accordingly, the effect of spectrum sensing errors of the micro eNodeB need not be considered.

In [Equation 12] where $$c_{m,n} = P_m^{Idle} \frac{n_P - n_D}{n_P}(1 - P_{FA}^{m,n})C_{m,n},$$

the throughput calculation module 182 may calculate $P_m^{Idle}$ using $\{\lambda_m\}$ and $\{\mu_m\}$ (i.e. $P_m^{Idle}=\mu_m/(\lambda_m+\mu_m)$). The busy-to-total period ratio $$\frac{n_P - n_D}{n_P}$$

may be preset in [Equation 12]. When the microcell operates on the downlink, the micro eNodeB is responsible for spectrum sensing. Thus there is no need for the throughput calculation module 182 to calculate the false alarm probability $P_{FA}^{m,n}$. The throughput calculation module 182 may calculate a channel capacity that the $n^{th}$ micro UE can achieve, when the $n^{th}$ micro UE transmits a signal without interference through successful spectrum sensing of an $m^{th}$ frequency resource, using $\{\gamma_{m,n}^{s}\}$ according to [Equation 14].

The throughput calculation module 182 may calculate the throughput of each micro UE according to [Equation 12], using the idle-to-total period ratio of a macro UE $P_m^{Idle}=\mu_m/(\lambda_m+\mu_m)$, the busy-to-total period ratio of the macro UE $$\frac{n_P - n_D}{n_P}$$

the channel capacity of the micro UE.

The frequency resource decision module 183 may determine a frequency resource to be allocated to each micro UE based on the throughputs of the micro UEs, in such a manner that the throughputs of the micro UEs are maximized while limiting interference from the macro UEs to or below a predetermined level, as is in the other scenarios. In determining the frequency resources to be allocated to the micro UEs, the frequency resource decision module 183 satisfies the condition expressed as [Equation 15].

The frequency resource allocation module 184 allocates the frequency resources decided by the frequency resource decision module 183 to the micro UEs. The transmitter 125 transmits information about the allocated frequency resources to the micro UEs.

Then the micro eNodeB performs spectrum sensing on an allocated frequency resource. In the absence of a signal from a macro UE to which the frequency resource is allocated, the micro eNodeB transmits an uplink signal to a micro UE. In this manner, spectrum sensing and signal transmission are repeated. If the environment is changed, the optimized frequency resource allocation is discontinued. Therefore, the frequency resource decision module 183 needs to decide an optimum frequency resources to be allocated to each micro UE by updating the SNR matrix $\{\gamma_{m,n}^s\}$. The frequency resource decision module 183 may update the SNR matrix $\{\gamma_{m,n}^s\}$ in a long period or a short period. For example, in case of TV white space, the state of each TV channel changes slowly and thus an information update period is lengthened. On the other hand, fading characteristics change rapidly in a mobile environment where UEs travel at high speed. To handle rapid fluctuation in fading characteristics, a short information update period is needed. In this manner, the frequency resource decision module 183 may update the SNR matrix $\{\gamma_{m,n}^s\}$ at intervals suitable for the environment of UEs.

Figure 11:
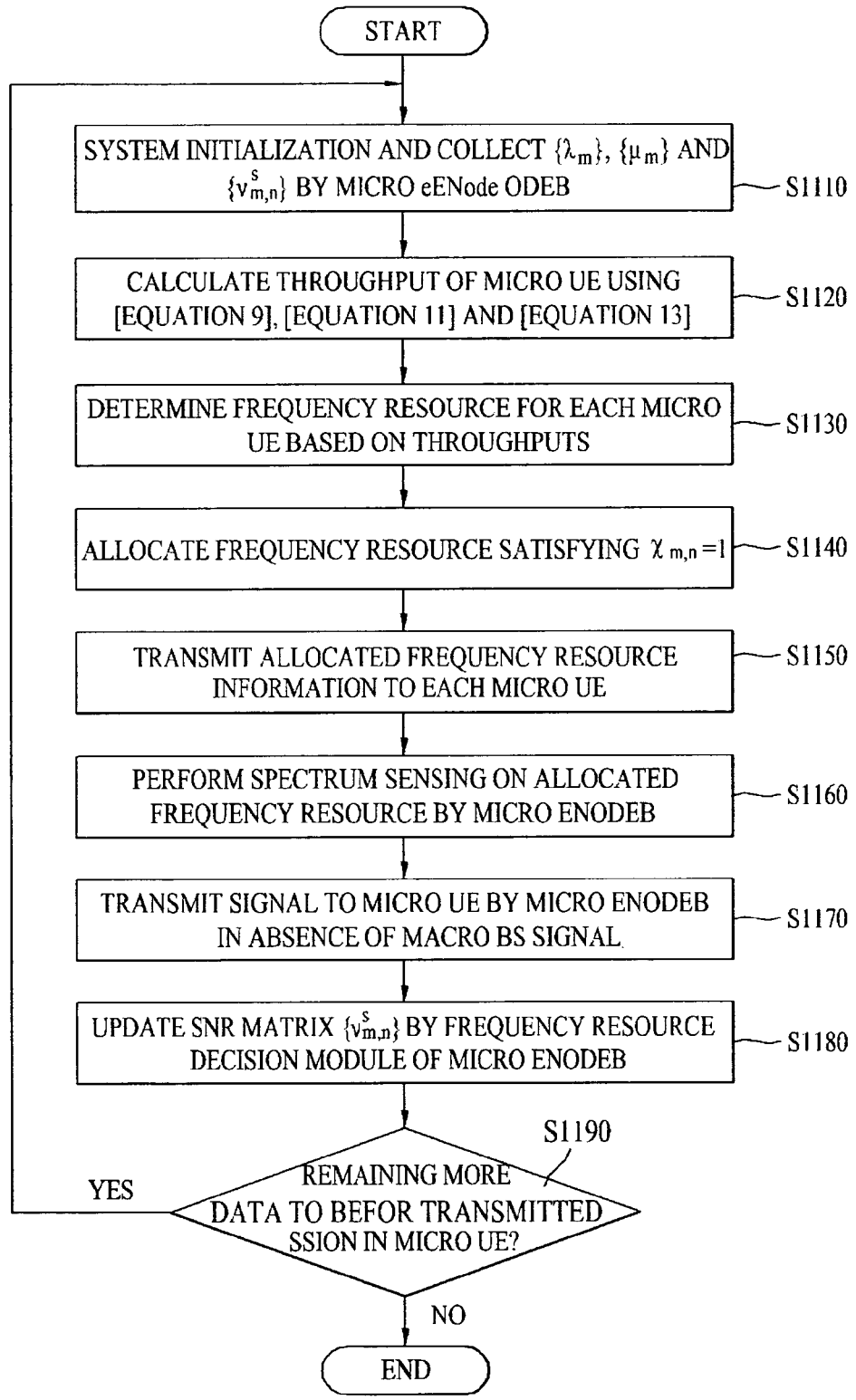
FIG. 11 is a flowchart illustrating an operation of a micro BS for allocating frequency resources in the third scenario according to the present invention.

FIG. 11 is a flowchart illustrating an operation of a micro eNodeB for allocating frequency resources in the third scenario according to the present invention.

Referring to FIG. 11, the micro eNodeB may collect system information about macro UEs, $\{\lambda_m\}$, $\{\mu_m\}$ and $\{\gamma_{m,n}^s\}$ during microcell initialization in step S1110. In step S1120, the throughput calculation module 182 of the micro eNodeB calculates the throughput of each micro UE using [Equation 9], [Equation 11] and [Equation 13]. The frequency resource decision module 183 may determine frequency resources to be allocated to micro UEs based on the calculated throughputs in step S1130. The frequency allocation module 184 allocates frequency resources satisfying $x_{m,n}=1$ to the micro UEs in step S1140. In step S1150, the transmitter 190 may transmit information about the allocated frequency resources (e.g. in the form of a frequency resource allocation matrix) to the micro UEs.

Then the micro eNodeB performs spectrum sensing on an allocated frequency resource based on the received frequency resource allocation information in step S1160. If detecting the absence of a signal transmitted by a macro UE having priority to use the frequency resource through spectrum sensing, the micro eNodeB transmits a downlink signal to a micro UE in step S1170. In step S1180, the frequency resource decision module 183 may update the SNR matrix $\{\gamma_{m,n}^s\}$. The micro eNodeB determines whether the micro UE has any more data to be transmitted in step S1190. When data remains to be transmitted in the micro UE, the micro eNodeB returns to step S1120.

Scenario 4: Macrocell: Downlink-Microcell: Downlink

Figure 12:
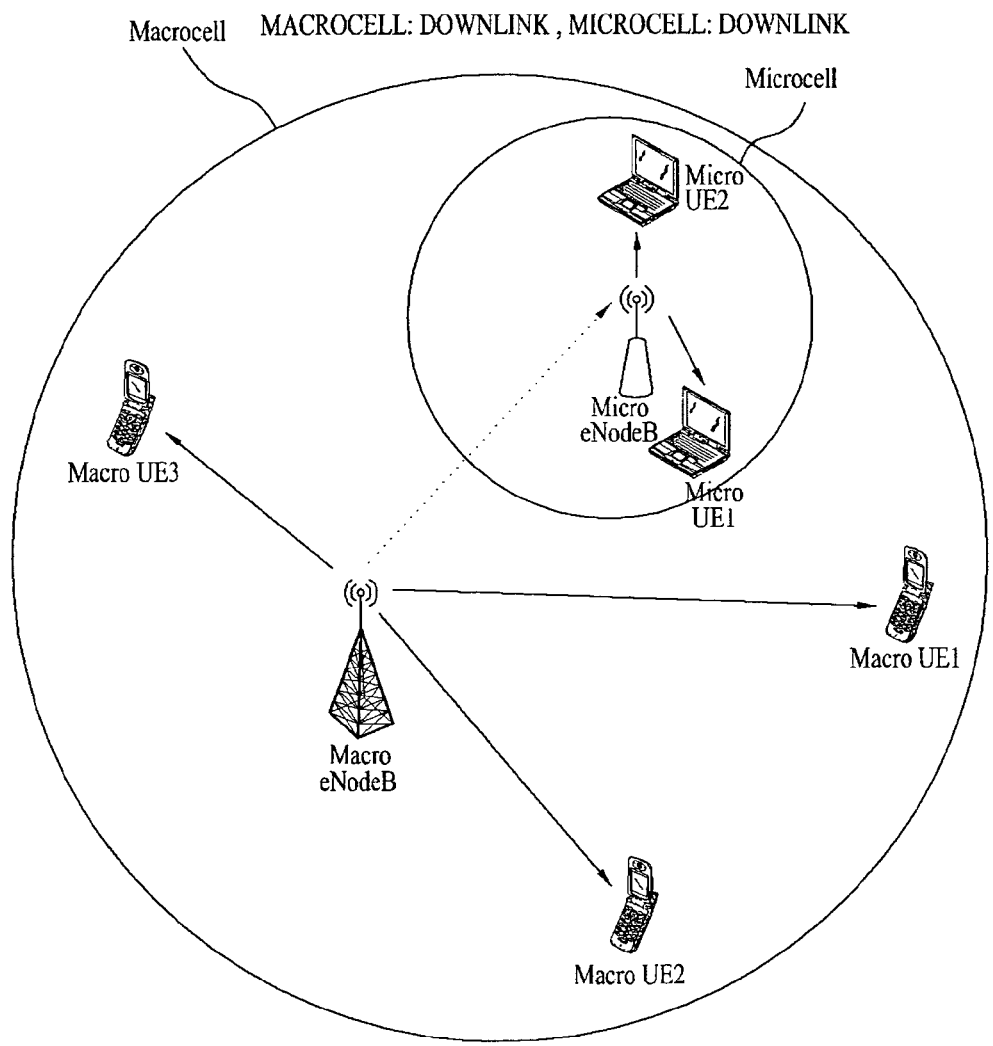
FIG. 12 illustrates a signal transmission relationship in a fourth scenario where a macrocell operates on a downlink and a microcell operates on an uplink in the hierarchical cell structure.

FIG. 12 illustrates a signal transmission relationship in a fourth scenario where a macrocell operates on a downlink and a microcell operates on a downlink in the hierarchical cell structure.

Referring to FIG. 12, three macro UEs and two micro UEs are present (M=3 and N=2) as in FIG. 6, by way of example. Since the macrocell operates on the downlink, a macro eNodeB transmits a downlink signal to each macro UE. In the illustrated case of FIG. 12, the macro eNodeB transmits a signal to Macro UE1, Macro UE2 and Macro UE3. The microcell also operates on the downlink and thus may transmit a downlink signal to Micro UE1 and Micro UE2.

In FIG. 12, solid lines indicate links from the macro eNodeB to the macro UEs and links from the micro eNodeB to the micro UEs. Although the macro eNodeB can use its frequency resources at any time, the micro eNodeB should borrow the frequency resources from the macro eNodeB. Hence, the micro eNodeB performs spectrum sensing on a signal received from the macro eNodeB before transmitting signals. A link via which the micro eNodeB receives a signal from the macro eNodeB for spectrum sensing is indicated by a dotted line.

Before the microcell starts to operate, the micro eNodeB may collect system information from the macro eNodeB during microcell initialization. Specifically, the initial information acquisition module 181 may receive information $\{\lambda_m\}$ and $\{\mu_m\}$ about traffic of each macro UE in a frequency resource allocated to the macro UE and information $\{\gamma_{m,n}^s\}$ about the SNR of a signal from each micro eNodeB, measured at each micro UE. Due to frequency selective fading, each frequency resource may have a different SNR.

The throughput calculation module 182 calculates a throughput $c_{m,n}$ that an $n^{th}$ micro UE can achieve, satisfying a given interference constraint, when the $n^{th}$ micro UE shares a frequency resource used by an $m^{th}$ macro UE, using the information collected by the initial information acquisition module 181 $\{\lambda_m\}$, $\{\mu_m\}$ and $\{\gamma_{m,n}^s\}$ by [Equation 12]. The microcell operates on the downlink and the micro eNodeB performs spectrum sensing and frequency resource allocation in the fourth scenario. Therefore, the micro eNodeB has prior knowledge of channels used by the macro UEs when allocating frequency resources. Accordingly, the effect of spectrum sensing errors of the micro eNodeB need not be considered. Thus there is no need for the throughput calculation module 182 to calculate the false alarm probability $P_{FA}^{m,n}$, as in the third scenario. The throughput calculation module 182 may calculate the throughput of each micro UE using the idle-to-total period ratio of a macro UE $P_m^{Idle}=\mu_m/(\lambda_m+\mu_m)$, the busy-to-total period ratio of the macro UE $$\frac{n_P - n_D}{n_P}$$

the channel capacity of the micro UE according to [Equation 13].

The frequency resource decision module 183 may determine frequency resources to be allocated to micro UEs based on the throughputs of the micro UEs, in such a manner that the throughputs of the micro UEs are maximized while limiting interference from the macro eNodeB to or below a predetermined level. In determining the frequency resources to be allocated to the micro UEs, the frequency resource decision module 183 satisfies the condition expressed in [Equation 15].

The frequency resource allocation module 184 allocates the frequency resources decided by the frequency resource decision module 183 to the micro UEs. The transmitter 125 transmits information about the allocated frequency resources to the micro UEs.

Then the micro eNodeB performs spectrum sensing on an allocated frequency resource. In the absence of a signal from the macro eNodeB in the frequency resource, the micro eNodeB transmits a downlink signal to a micro UE using the frequency resource. In this manner, spectrum sensing and signal transmission are repeated. If the environment is changed, optimized frequency resource allocation is discontinued. Therefore, the frequency resource decision module 183 needs to decide an optimum frequency resource to be allocated to each micro UE by updating the SNR matrix $\{\gamma_{m,n}^s\}$. The frequency resource decision module 183 may update the SNR matrix $\{\gamma_{m,n}^s\}$ in a long period or a short period. For example, in case of TV white space, the state of each TV channel changes slowly and thus an information update period is lengthened. On the other hand, fading characteristics change rapidly in a mobile environment where UEs travel at high speed. To handle rapid fluctuation in fading characteristics, a short information update period is needed. In this manner, the frequency resource decision module 183 may update the SNR matrix $\{\gamma_{m,n}^s\}$ in a period suitable for the environment of UEs.

The micro eNodeB allocates frequency resources in the fourth scenario in a similar manner to in the third scenario illustrated in FIG. 11.

Figure 13:
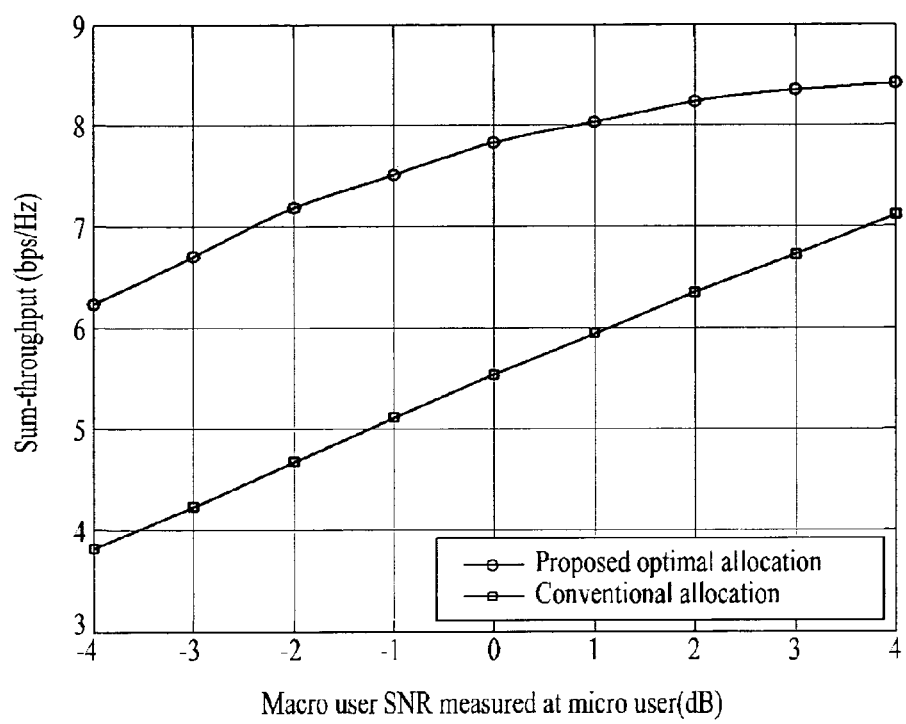
FIG. 13 is a graph illustrating sum throughputs with respect to macro UE Signal to Noise Ratios (SNRs) measured at a micro UE.
Figure 14:
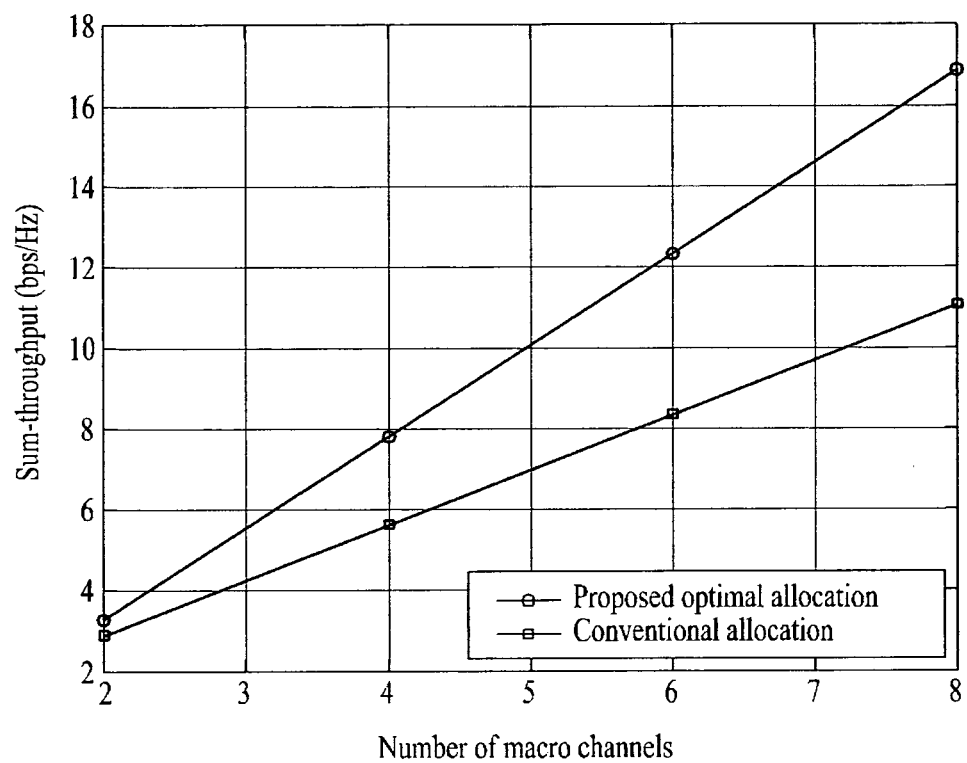
FIG. 14 is a graph comparing a proposed optimal allocation scheme of the present invention with a conventional allocation scheme in terms of sum throughputs with respect to number of frequency resources (number of macro channels).
Figure 15:
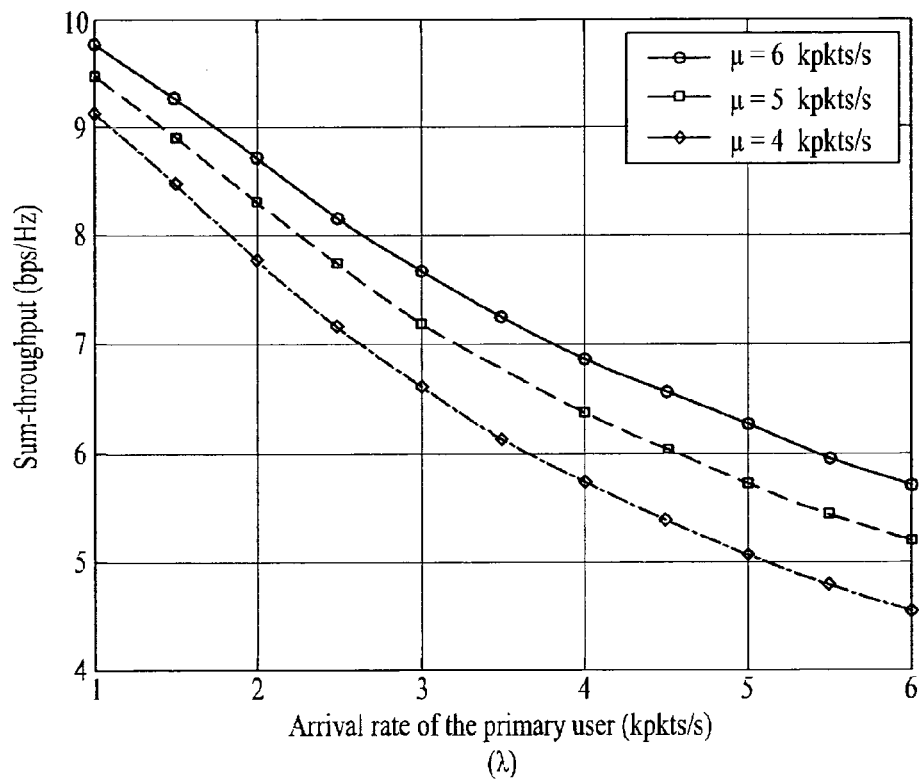
FIG. 15 is a graph comparing the proposed optimal allocation scheme of the present invention with the conventional allocation scheme in terms of sum throughputs with respect to traffic values related to arrival rates or service rates of packets of a macro UE.

The utilities of the resource allocations in the first to fourth scenarios according to the present invention are numerically illustrated in FIGS. 13, 14 and 15. The utilities are assessed under the same conditions that the bandwidth of a frequency resource is 1 MHz, $n_D$=10 samples, $n_P$=100 samples and the same target probability is set for all frequency resources (e.g. $P_D^m$=0.9 for m=0, 1, . . . , M−1). Transmissions from macro UEs can be protected by satisfying a predetermined or higher target detection probability. It is assumed that the SNR of a micro UE signal $\gamma_n^s$ is 10 dB. To model variations caused by different frequency resource allocations, it is assumed that the SNRs of macro UE signals that each micro UE experiences have a uniform distribution with standard deviation $\sigma_{snr}$=5 and traffic values also have uniform distribution with standard deviation $\sigma_{traffic}$=1.2 kpkts/s. For macro UEs, the average idle period 1/λ is 0.5 msec and the average busy period 1/μ is 0.25 msec. The average values are calculated after 10,000 repetitions. In the mean time, it is assumed that M=N.

FIG. 13 is a graph illustrating sum throughputs with respect to macro UE SNRs measured at a micro UE.

Referring to FIG. 13, sum throughputs are calculated, while changing the SNR of a macro UE signal in the proposed optical allocation scheme of the present invention and the conventional allocation scheme. The number of frequency resources N is 4. The proposed optical allocation scheme of the present invention allocates frequency resources so as to maximize throughput, while interference caused to a macro UE by a micro UE is maintained at a conventional level. Thus it is noted from FIG. 13 that the proposed optimal allocation of the present invention offers a higher throughput than the conventional scheme in every SNR period. In addition, the increase of SNR improves the performance of spectrum sensing, thereby increasing sum throughput.

FIG. 14 is a graph comparing a proposed optimal allocation scheme of the present invention with a conventional allocation scheme in terms of sum throughputs with respect to number of frequency resources (numbers of macro channels).

Referring to FIG. 14, the SNR of a macro UE signal is set to 0 dB. It is noted from FIG. 14 that the proposed optical allocation of the present invention has a higher throughput than the conventional scheme with respect to any number of frequency resources. In addition, as there are more frequency resources, the performance difference increases, because as more frequency resources become available, there is a higher probability of generating frequency resources favorable to a specific UE.

FIG. 15 is a graph comparing the proposed optimal allocation scheme of the present invention with the conventional allocation scheme in terms of sum throughputs with respect to traffic values related to arrival rates or service rates of packets of a macro UE.

Referring to FIG. 4, four frequency resources are given (N=4). As the arrival rate λ of a macro UE increases, the macro UE occupies a frequency resource for packet transmission for a longer time, thereby reducing a use opportunity for a micro UE and thus the sum throughput of the micro UE. On the other hand, as the service rate μ of a macro UE increases, the macro UE occupies a frequency resource for packet transmission for a shorter time, thereby increasing a use opportunity for a micro UE and thus the sum throughput of the micro UE.

The proposed optimal allocation scheme of the present invention is applicable to IEEE 802.22 Wireless Regional Area Network (WRAN) and IEEE 802.11 TV White Space (TVWS) as well as a general hierarchical cell structure. IEEE 802.22 was proposed for the purpose of reusing TV frequency resources for wireless Internet. In the IEEE 802.22 system, each user uses a bandwidth of 6-MHz according to a TV channel, especially VHF channel 5-15 and UHF channel 14-51. Therefore, the bandwidth W is 6 MHz, the spectrum sensing period is 2 seconds and the target detection probability is 0.9 in the proposed scheme.

In the energy detection-based spectrum sensing, as the target detection probability increases, the false alarm probability also increases. Hence, a minimum false alarm probability satisfying the target detection probability 0.9 is calculated to thereby maximize the throughput of a WRAN user. In addition, if a signal of a primary user using TV resources is detected in a channel, the channel should be empty within 2 seconds. Once the primary user occupies the channel, the channel is not available to a secondary user at least for 10 minutes.

The proposed allocation scheme of the present invention is also applicable to IEEE 802.11 Wireless Local Area Network (WLAN). A TV band reusing device has been proposed that operates using a transmission scheme suitable for a large coverage of up to tens of kilometers and a low user density (e.g. 60 persons/km² or below) in the IEEE 802.22 system. WLAN designed for low-power, small-scale communication is also suitable for using a TV band. In this context, the IEEE 802.11 TVWS standard was proposed and associated research has been conducted.

Accordingly, Carrier Sensing Multiple Access (CSMA) based on an IEEE 802.11 Listen-before-Talk-based protocol, Distributed Coordination Function (DCF) can be applied to spectrum sensing. If the IEEE 802.11 technology is applied to the proposed allocation scheme of the present invention, spectrum sensing for TV signal detection is carried out during an InterFrame Spacing (IFS) between data transmission units called MAC Protocol Data Units (MPDUs) because no signal is transmitted in the IFS.

Figure 16:
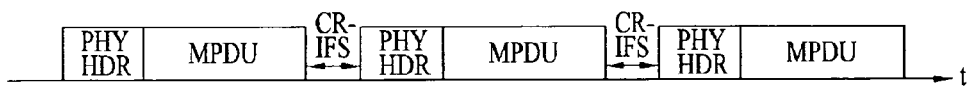
FIG. 16 illustrates a Carrier sensing Range-InterFrame Spacing (CR-IFS) defined for spectrum sensing in an Institute of Electrical and Electronics Engineers (IEEE) 802.11 system.

FIG. 16 illustrates a CR-IFS defined for spectrum sensing in an IEEE 802.11 system.

Referring to FIG. 16, the IEEE 802.11 system may define a CR-IFS unlike a conventional IFS, for spectrum sensing. An MPDU is a data transmission unit in the IEEE 802.11 system and a physical layer header (PHY HDR) is configured in the form of a preamble carrying signals necessary for data transmission. If no TV signal is detected through spectrum sensing during a CR-IFS before data transmission, a WLAN terminal transmits a signal using Carrier Sensing Multiple Access/Collision Avoidance (CSMA/CA) protocol after Distributed Inter Frame Space (DIFS) duration, and receives an ACKnowledgment (ACK) signal after a Short IFS (SIFS), thus confirming data transmission. When multiple TV channels are allocated to WLAN terminals, the proposed allocation scheme of the present invention is used.

MODE FOR INVENTION

Various embodiments have been described in the best mode for carrying out the invention.

INDUSTRIAL APPLICABILITY

An apparatus and method for allocating a frequency resource to a micro UE in a mobile communication system according to the present invention are applicable to 3GPP LTE and other systems.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that do not explicitly cite each other in the appended claims may be presented in combination as an exemplary embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

The invention claimed is:

1. A method for allocating frequency resources to each micro User Equipment (UE) at a micro Base Station (BS) in mobile communication system of a hierarchical cell structure, the method comprising:

acquiring information about traffic of each macro UE or a macro BS in a frequency resource allocated to the each macro UE or the macro BS, first Signal-to-Noise Ratio (SNR) information about an SNR of a signal from the each macro UE or the macro BS, measured at each micro UE and second SNR information about an SNR of a signal from the each micro UE, measured at the micro BS;

calculating throughput of the each micro UE using the traffic information, the first SNR information and the second SNR information;

determining a frequency resource to be allocated to the each micro UE using information about the calculated throughput; and allocating the determined frequency resource to the each micro UE.

2. The method according to claim 1, wherein the traffic information of the each macro UE or a macro BS includes information $\{\lambda_m\}$ about an average arrival rate of packets of the each macro UE or the macro BS and information $\{\mu_m\}$ about an average service rate of packets of the each macro UE or the macro BS.

3. The method according to claim 2, wherein the first SNR information is information about SNRs of signals from the each macro UE or the macro BS in first to $M^{th}$ frequency resources, measured at first to $N^{th}$ micro UEs and expressed as an M×N matrix.

4. The method according to claim 3, wherein the second SNR information is information about SNRs of signals from the first to $N^{th}$ micro UEs in the first to $M^{th}$ frequency resources and expressed as an M×N matrix.

5. The method according to claim 2, wherein the throughput calculation comprises calculating the throughput of the each micro UE so that interference caused to the each micro UE satisfies a preset condition.

6. The method according to claim 5, wherein the throughput calculation comprises calculating using the throughput of the each micro UE using the information $\{\lambda_m\}$ about the average arrival rate of packets of the each macro UE or the macro BS, the information $\{\mu_m\}$ about the average service rate of packets of the each macro UE or the macro BS, a preset ratio of a busy period corresponding to data transmission period of the each macro UE to a total period of the each macro UE, a non-false alarm probability being a probability of correctly detecting, through spectrum sensing, that the each macro UE or the macro BS is not using an $m^{th}$ frequency resource by an $n^{th}$ micro UE, and a channel capacity that the $n^{th}$ micro UE can achieve when the $n^{th}$ micro UE transmits a signal without interference through successful spectrum sensing.

7. The method according to claim 6, wherein the calculated throughput is expressed as the following [Equation A], $$c_{m,n} = P_m^{Idle} \frac{n_P - n_D}{n_P}(1 - P_{FA}^{m,n})C_{m,n} \quad \text{[Equation A]}$$

where $P_m^{Idle}$ denotes a ratio of an idle period of the each macro UE or the macro BS to a total period of the each macro UE or
the macro BS, calculated using the information $\{\lambda_m\}$ about the average arrival rate of packets of the each macro UE or the macro BS,
$n_D$ denotes a sensing slot period, $n_r$ denotes a sample period, $$\frac{n_P - n_D}{n_P}$$

denotes the preset ratio of the busy period to the total period, $1-P_{FA}^{m,n}$ denotes the non-false alarm probability calculated using the first SNR information and $C_{m,n}$ denotes the channel capacity calculated using the second SNR information.

8. The method according to claim 7, wherein the ratio of the idle period to the total period is calculated using the information $\{\lambda_m\}$ about the average arrival rate of packets of the each macro UE or the macro BS and the information $\{\mu_m\}$ about the average service rate of packets of the each macro UE or the macro BS.

9. The method according to claim 7, wherein a false alarm probability $P_{FA}^{m,n}$ is calculated using the first SNR information, a spectrum sensing time period of the each micro UE and a target detection probability of a signal from the each micro UE or the micro BS.

10. The method according to claim 9, wherein
the false alarm probability $P_{FA}^{m,n}$ is calculated using the following (Equation B), $$P_{FA}^{m,n} = Q\left(\sqrt{n_D}\, \gamma_{m,n}^P + (1+\gamma_{m,n}^P)Q^{-1}(P_D^t)\right) \quad \text{[Equation B]}$$

where a Q function is a monotonically decreasing function for x, given as $$Q(x) = \frac{1}{\sqrt{2\pi}} \int_x^{\infty} e^{-t^2/2} dt,$$

$Q^{-1}$ denotes inverse of the Q function, $P_D^t$ denotes the target detection probability of a signal from the each micro UE or the micro BS and $\gamma_{m,n}^P$ denotes the firt SNR information.

11. The method according to claim 7, wherein the channel capacity $C_{m,n}$ is calculated using the following [Equation C], $$C_{m,n} = \log_2(1+\gamma_{m,n}^s), \quad \text{[Equation C]}$$

where $\{\gamma_{m,n}^s\}$ denotes the second SNR information.

12. The method according to claim 1, wherein the frequency resource determination comprises determining a frequency resource that can maximize a sum throughput of the each micro UE.

13. The method according to claim 12, wherein the determined frequency resource is calculated using the following [Equation D], $$\max \sum_{m=0}^{M-1} \sum_{n=0}^{N-1} C_{m,n} x_{m,n} \quad \text{[Equation D]}$$

$$\text{s.t.} \sum_{m=0}^{M-1} x_{m,n} \leq 1,\, n=1,\ldots,N$$

$$\sum_{n=0}^{N-1} x_{m,n} \leq 1,\, m=1,\ldots,M$$

$$x_{m,n} \geq 0, \forall\, m, n$$

where $$\sum_{m=0}^{M-1} \sum_{n=0}^{N-1} C_{m,n} x_{m,n}$$

denotes a sum throughput of all cases in which an $m^{th}$ frequency resource is allocated to an $n^{th}$ micro UE, $$\sum_{m=0}^{M-1} x_{m,n} \leq 1$$

is a constraint that up to one frequency resource should be allocated to each micro UE, $$\sum_{n=0}^{N-1} x_{m,n} \leq 1$$

is a constraint that up to one micro UE should be allocated to each frequency resource and $x_{m,n} \geq 0$ indicates that a frequency resource should be allocated ($x_{m,n}=1$) or not allocated ($x_{m,n}=0$).

14. The method according to claim 12, wherein the determined frequency resources are expressed as a frequency resource allocation matrix and the frequency resource determination comprises calculating the frequency resource allocation matrix using an auction algorithm or a Hungarian algorithm.

15. The method according to claim 12, wherein the frequency resource allocation comprises allocating one determined frequency resource to only one micro UE.

16. A micro Base Station (BS) for allocating frequency resources to each micro User Equipment (UE) in mobile communication system of a hierarchical cell structure, the micro BS comprising:
    an initial information acquisition module for acquiring information about traffic of each macro UE or a macro BS in a frequency resource allocated to the each macro UE or the macro BS, first Signal-to-Noise Ratio (SNR) information about an SNR of a signal from the each macro UE or the macro BS, measured at each micro UE and second SNR information about an SNR of a signal from the each micro UE, measured at the micro BS;
    a throughput calculation module for calculating throughput of the each micro UE using the traffic information, the first SNR information and the second SNR information;
    a frequency resource decision module for determining a frequency resource to be allocated to the each micro UE using information about the calculated throughput; and
    a frequency resource allocation module for allocating the determined frequency resource to the each micro UE.

17. The micro BS according to claim 16, wherein the traffic information of the each macro UE or a
    macro BS included information $\{\lambda_m\}$ about an average arrival rate of packets of the each macro UE or the macro BS and
    information $\{\mu_m\}$ about an average service rate of packets of the each macro UE or the macro BS.

18. The micro BS according to claim 17, wherein the first SNR information is information about SNRs of signals from the each macro UE or the macro BS in
    first to $M^{th}$ frequency resources, measured at first to $N^{th}$ micro UEs and expressed as an M×N matrix.

19. The method according to claim 18, wherein the second SNR information is information about SNRs of signals from the first to $N^{th}$ micro UEs in the first to $M^{th}$ frequency resources and is expressed as an M×N matrix.

20. A method for allocating frequency resources to each micro User Equipment (UE) in a micro Base Station (BS) in mobile communication system of a hierarchical cell structure, the method comprising:
    acquiring information about traffic of each macro UE or a macro BS in a frequency resource allocated to the each macro UE or the macro BS and Signal-to-Noise Ratio (SNR) information about an SNR of a signal from the micro BS, measured at the each micro UE;
    calculating throughput of the each micro UE using the traffic information and the SNR information;

determining a frequency resource to be allocated to the each micro UE using information about the calculated throughput; and allocating the determined frequency resource to the each micro UE.

21. The method according to claim 20, wherein the traffic information of the each macro UE or the macro BS includes information $\{\lambda_m\}$ about an average arrival rate of packets of the each macro UE or the macro BS and information $\{\mu_m\}$ about an average service rate of packets of the each macro UE or the macro BS.

22. The method according to claim 21, wherein the SNR information is information about SNRs of a signal from the micro BS in first to $M^{th}$ frequency resources, measured by first to $N^{th}$ micro UEs and expressed as an M×N matrix.

23. The method according to claim 21, wherein the throughput calculation comprises calculating the throughput of the each micro UE so that interference caused to the each micro UE satisfies a preset condition.

24. The method according to claim 23, wherein the throughput calculation comprises calculating the throughput of the each micro UE using the information $\{\lambda_m\}$ about the average arrival rate of packets of the each macro UE or the macro BS, the information $\{\mu_m\}$ about the average service rate of packets of the each macro UE or the macro BS, a preset ratio of a busy period corresponding to data transmission period of the macro UE to a total period of the each macro UE and a channel capacity that an $n^{th}$ micro UE can achieve when the $n^{th}$ micro UE transmits a signal in an $m^{th}$ frequency resource without interference through successful spectrum sensing.

25. The method according to claim 24, wherein the calculated throughput is expressed as the following [Equation E], $$c_{m,n} = P_m^{Idle} \frac{n_P - n_D}{n_P} (1 - P_{FA}^{m,n}) C_{m,n} \qquad \text{[Equation E]}$$

where $P_m^{Idle}$ denotes a ratio of an idle period of the each macro UE or the macro BS to a total period of the each macro UE or the macro BS, calculated using the information $\{\lambda_m\}$ about the average arrival rate of packets of the each macro UiE or the macro BS and the information $\{\mu_m\}$ about the average service rate of packets of the each macro LE or the macro BS, $n_D$ denotes a sensing slot period, $n_P$ denotes a sample period, $$\frac{n_P - n_D}{n_P}$$

denotes the preset ratio of the busy period to the total period and $C_{m,n}$ denotes the channel capacity calculated using the SNR information.

26. The method according to claim 25, wherein the channel capacity $C_{m,n}$ is calculated using the following [Equation F], $$C_{m,n} = \log_2(1 + \gamma_{m,n}^s), \qquad \text{[Equation F]}$$

where $\{\gamma_{m,n}^s\}$ denotes the SNR information.

27. The method according to claim 20, wherein the frequency resource determination comprises determining a frequency resource that can maximize a sum throughput of the each micro UE.

28. The method according to claim 27, wherein the determined frequency resource is calculated using the following [Equation G], $$\max \sum_{m=0}^{M-1} \sum_{n=0}^{N-1} c_{m,n} x_{m,n} \qquad \text{[Equation G]}$$

$$\text{s.t.} \sum_{m=0}^{M-1} x_{m,n} \leq 1, n = 1, \ldots, N$$

$$\sum_{n=0}^{N-1} x_{m,n} \leq 1, m = 1, \ldots, M$$

$$x_{m,n} \geq 0, \forall m, n$$

where $$\sum_{m=0}^{M-1} \sum_{n=0}^{N-1} c_{m,n} x_{m,n}$$

denotes a sum throughput of all cases in which an $m^{th}$ frequency resource is allocated to an $n^{th}$ micro UE, $$\sum_{m=0}^{M-1} x_{m,n} \leq 1$$

is a constraint that up to one frequency resource should be allocated to each micro UE, $$\sum_{n=0}^{N-1} x_{m,n} \leq 1$$

is a constraint that up to one micro UE should be allocated to each frequency resource and $x_{m,n} \geq 0$ indicates that a frequency resource should be allocated ($x_{m,n}=1$) or not allocated ($x_{m,n}=0$).

29. The method according to claim 28, wherein the frequency resource allocation comprises allocating one determined frequency resource to only one micro UE.

30. A micro Base Station (BS) for allocating frequency resources to each micro User Equipment (UE) in mobile communication system of a hierarchical cell structure, the micro BS comprising:

an initial information acquisition module for acquiring information about traffic of each macro UE or a macro BS in a frequency resource allocated to the each macro UE or the macro BS and Signal-to-Noise Ratio (SNR) information about an SNR of a signal from the micro BS, measured at the each micro UE;

a throughput calculation module for calculating throughput of the each micro UE using the traffic information and the SNR information;

a frequency resource decision module for determining a frequency resource to be allocated to the each micro UE using information about the calculated throughput;

and a frequency resource allocation module for allocating the determined frequency resource to the each micro UE.

31. The micro BS according to claim 30, wherein the traffic information includes information $\{\lambda_m\}$ about an average arrival rate of packets of the each macro UE or the macro BS and information $\{\mu_m\}$ about an average service rate of packets of the each macro UE or the macro BS.

32. The micro BS according to claim 31, wherein the SNR information is information about SNRs of a signal from the micro BS in first to $M^{th}$ frequency resources, measured from first to $N^{th}$ micro UEs and expressed as an M×N matrix.

33. The micro BS according to claim 31, wherein the throughput calculation module calculates the throughput of the each micro UE so that interference caused to the each micro UE satisfies a preset condition.

34. The micro BS according to claim 33, wherein the throughput calculation module calculates the throughput of the each micro UE using the information $\{\lambda_m\}$ about the average arrival rate of packets of the each macro UE or the macro BS, the information $\{\mu_m\}$ about the average service rate of packets of the each macro UE or the macro BS, a preset ratio of a busy period corresponding to data transmission period of the each macro UE to a total period of the each macro UE and a channel capacity that an $n^{th}$ micro UE can achieve when the $n^{th}$ micro UE transmits a signal in an $m^{th}$ frequency resource without interference through successful spectrum sensing.

35. The micro BS according to claim 30, wherein the frequency resource decision module comprises determining a frequency resource that can maximize a sum throughput of the each micro UE.

36. The micro BS according to claim 35, wherein the frequency resource decision module calculates the frequency resource using the following [Equation H], $$\max \sum_{m=0}^{M-1} \sum_{n=0}^{N-1} c_{m,n} x_{m,n} \quad \text{[Equation H]}$$

$$\text{s.t.} \sum_{m=0}^{M-1} x_{m,n} \leq 1, \quad n = 1, \ldots, N$$

$$\sum_{n=0}^{N-1} x_{m,n} \leq 1, \quad m = 1, \ldots, M$$

$$x_{m,n} \geq 0, \quad \forall\, m, n$$

where $$\sum_{m=0}^{M-1} \sum_{n=0}^{N-1} c_{m,n} x_{m,n}$$

denotes a sum throughput of all cases in which an $m^{th}$ frequency resource is allocated to an $n^{th}$ micro UE, $$\sum_{m=0}^{M-1} x_{m,n} \leq 1$$

is a constraint that up to one frequency resource should be allocated to each micro UE, $$\sum_{n=0}^{N-1} x_{m,n} \leq 1$$

is a constraint that up to one micro UE should be allocated to each frequency resource and $x_{m,n} \geq 0$ indicates that a frequency resource should be allocated ($x_{m,n}=1$) or not allocated ($x_{m,n}=0$).

37. The micro BS according to claim 36, wherein the frequency resource allocation module allocates a determined one frequency resource to only one micro UE.

\* \* \* \* \*